United States Patent
Dworak et al.

(10) Patent No.: US 9,811,690 B2
(45) Date of Patent: Nov. 7, 2017

(54) PROTECTING HIDDEN CONTENT IN INTEGRATED CIRCUITS

(71) Applicant: Southern Methodist University, Dallas, TX (US)

(72) Inventors: Jennifer L. Dworak, Dallas, TX (US); Alfred L. Crouch, Cedar Park, TX (US); Adam Zygmontowicz, Allen, TX (US); John C. Potter, Austin, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 14/666,281

(22) Filed: Mar. 23, 2015

(65) Prior Publication Data

US 2015/0349968 A1 Dec. 3, 2015

Related U.S. Application Data

(60) Provisional application No. 61/969,223, filed on Mar. 23, 2014.

(51) Int. Cl.
*G06F 21/00* (2013.01)
*G06F 21/79* (2013.01)
(Continued)

(52) U.S. Cl.
CPC ..... *G06F 21/79* (2013.01); *G01R 31/318588* (2013.01); *G06F 21/72* (2013.01);
(Continued)

(58) Field of Classification Search
None
See application file for complete search history.

(56) References Cited

U.S. PATENT DOCUMENTS 7,653,849 B1 1/2010 Tabatabaei
8,495,758 B2 7/2013 Goyal et al.
(Continued)

OTHER PUBLICATIONS

Nara et al., "State-dependent Changeable Scan Architecture against Scan-based Side Channel Attacks," Circuit Systems ISCAS Proc. 2010 IEEE Int. Symp. On, May 2010, pp. 1867-1870.*
(Continued)

*Primary Examiner* — Hadi Armouche
*Assistant Examiner* — Andrew Steinle
(74) *Attorney, Agent, or Firm* — Daniel J. Chalker; Chalker Flores, LLP

(57) ABSTRACT

Various integrated circuits protect hidden content e.g., embedded instruments, keys, data, etc.) using scan cell circuit(s). For example, a first scan cell circuit is connected to the hidden content, and a second scan cell circuit is connected to the first scan cell circuit forming all or part of a serial data path. The first scan cell circuit provides access to the hidden content whenever the first scan cell circuit is in a first specified state and prevents access whenever the first scan cell circuit is in a different state. The first scan cell circuit does not interrupt the serial data path when the first scan cell circuit is in the different state. The second scan cell circuit changes an operational characteristic of the first scan cell circuit whenever the second scan cell circuit is in a second specified state. In some cases, the second scan cell circuit can be eliminated.

77 Claims, 10 Drawing Sheets

(51) Int. Cl.
  *G06F 21/72* (2013.01)
  *G06F 21/80* (2013.01)
  *G06F 21/75* (2013.01)
  *G01R 31/3185* (2006.01)
  *G06F 13/42* (2006.01)

(52) U.S. Cl.
  CPC .............. *G06F 21/75* (2013.01); *G06F 21/80* (2013.01); *G06F 13/4282* (2013.01)

(56) References Cited

U.S. PATENT DOCUMENTS

| | | | |
|---|---|---|---|
| 8,881,301 B2 | 11/2014 | Crouch et al. | |
| 2004/0236954 A1* | 11/2004 | Vogt | G06F 21/32 713/186 |
| 2009/0132882 A1* | 5/2009 | Chen | G01B 31/318536 714/731 |
| 2011/0083195 A1* | 4/2011 | Crouch | G01R 31/318558 726/27 |
| 2011/0271160 A1* | 11/2011 | Whetsel | G01R 31/3177 714/727 |
| 2011/0314514 A1* | 12/2011 | Goyal | G01R 31/318572 726/2 |
| 2013/0067290 A1* | 3/2013 | Tekumalla | G01R 31/318575 714/726 |
| 2014/0095101 A1 | 4/2014 | Gizdarski | |

OTHER PUBLICATIONS

Dworak, Jennifer, et al., "Board Security Enhancement using New Locking SIB-based Architectures," Proceedings of the IEEE International Test Conference, 2014.

Kim, I.S., et al., "Agent-based honeynet framework for protecting servers in campus networks," IET Information Security, May 22, 2012, vol. 6:3, pp. 202-211.

Lee, Jeremy, et al., "Securing Designs Against Scan-Based Side-Channel Attacks," Dependable Secure Comput., IEEE Trans., vol. 4:4, pp. 325-336, Dec. 2007.

Lee, Jeremy, et al., "Securing Scan Design Using Lock & Key Technique," in Defect and Fault Toloerance in VLSI Sytems, DFT 2005, 20th IEEE International Symposium, 2005, pp. 51-62.

Mukhopadhyay, D., et al., "CryptoScan: A Secured Scan Chain Architecture," Proceedings of the 14th Asian Test Symposium, IEEE Computer Society, 2005, pp. 348-353.

Rosenfeld, Kurt, et al., "Attacks and Defenses for JTAG," Des. Test Comput. IEEE, vol. 27:12, Feb. 2010, pp. 36-47.

Yang, Bo, et al., "Scan Based Side Channel Attack on Dedicated Hardware Implementations of Data Encryption Standard," Proceedings of the 2004 Test Conference ITC, 2004, vol. 26, pp. 339-344.

Atobe, Yuta, et al., "Dynamically Changeable Secure Scan Architecture against Scan-Based Side Channel Attack," Int. SoC Des. Conf. ISOCC, Nov. 4-7, 2012, pp. 155-158.

Buskey, Ronald F., et al., "Protected JTAG," Proceedings of the 2006 Int. Conf. on Parallel Processing Workshops, Aug. 14-18, 2006, 8 pp.

Clark, CJ, "Anti-tamper JTAG TAP design enables DRM to JTAG registers and P1687 on-chip instruments," Hardw.-Oriented Secur. Trust HOST 2010 IEEE Int. Symp. On, Jun. 13-14, 2010, pp. 19-24.

Dworak, Jennifer, et al., "Don't Forget to Lock your SIB: Hiding Instruments using P1687," Int. Test Conf, Sep. 2013, pp. 1-10.

Kamal, Abdel Alim, et al., "A Scan-Based Side Channel Attack on the NTRUEncrypt Cryptosystem," 2012 7th Int. Conf. on Availability, Reliability and Security, Aug. 20-24, 2012, pp. 402-409.

Nara, Ryuta, et al., "State-dependent Changeable Scan Architecture against Scan-based Side Channel Attacks," Circuit Systems ISCAS Proc. 2010 IEEE Int. Symp. On, May 2010, pp. 1867-1870.

Pierce, Luke, et al., "Enhanced Secure Architecture for Joint Action Test Group Systems," IEEE Transactions on Very Large Scale Integration (VLSI) Systems, vol. 21, No. 7, Jul. 2013, pp. 1342-1345, Jul. 31, 2016.

Da Rolt, Jean, et al., "Are advanced DfT structures sufficient for preventing scan-attacks?" 2012 IEEE 30th VLSI Test Symposium (VTS), Apr. 23-25, 2012, pp. 246-251.

Sengar, Gaurav, et al., "Secured Flipped Scan-Chain Model for Crypto-Architecture," IEEE Transactions on Computer-Aided Design of Integrated Circuits and Systems, vol. 26, No. 11, Nov. 2007, pp. 2080-2084.

\* cited by examiner

PROTECTING HIDDEN CONTENT IN INTEGRATED CIRCUITS

CROSS-REFERENCE TO RELATED APPLICATIONS

This application is a non-provisional patent application of and claims priority to U.S. provisional patent application Ser. No. 61/969,223 filed on Mar. 23, 2014 and entitled "Protecting Hidden Content in Integrated Circuits", the contents of which are hereby incorporated by reference in their entirety.

This application is related to U.S. patent application Ser. No. 14/666,295 filed on Mar. 23, 2015 and entitled "Protecting Hidden Content in Integrated Circuits", which is a non-provisional patent application of and claims priority to U.S. provisional patent application Ser. No. 61/969,220 filed on Mar. 23, 2014 and entitled "Protecting Hidden Content in Integrated Circuits", the contents of which are hereby incorporated by reference in their entirety.

STATEMENT OF FEDERALLY FUNDED RESEARCH

This invention was made with government support under grants CCF-1110290 and CCF-1061164 awarded by the NSF. The government has certain rights in the invention.

TECHNICAL FIELD OF THE INVENTION

The present invention relates in general to the field of integrated circuits, and more particularly, to protecting hidden content in integrated circuits.

BACKGROUND OF THE INVENTION

Without limiting the scope of the invention, its background is described in connection with IEEE standards 1149.1 and 1687.

Over the last decade there has been a proliferation in the number and type of on-chip embedded instruments, keys, and data. Some examples include memory and logic built-in self-test controllers (MBIST and LBIST), trace buffers, temperature and delay sensors, voltage and frequency domain controllers, and I/O configuration hardware. They are valuable tools during test, debug, and diagnosis, as well as when portions of the chip (such as the SERDES I/O) need to be configured.

Design for Testability ("DFT") hardware, especially scan chains, are well-known avenues for attackers to gain unauthorized access to internal chip infrastructure. In the case of Joint Test Action Group ("JTAG") ports in typical IEEE 1149.1 scan architectures, this often involves an attacker shifting undocumented instruction encodings into the chain and looking at the chip response. Scan chains may also be harnessed by unauthorized users to capture and read out internal circuit states and break encryption hardware (e.g. [2]-[4]). Thus, some chip providers fuse off the JTAG port after test and before the chip is shipped. Unfortunately, the port can then no longer be used for debug, configuration, or diagnosis.

Many researchers have proposed other methods of protecting the JTAG port and scan chains from attack. Some methods use challenge-response pairs along with hashes or encryption algorithms (e.g. [5]-[8]). Others reorder the scan chain if the first k-bits shifted in don't correspond to a pre-chosen key (e.g. [9], [10]). Other methods disguise chain data by changing it with inversions or XORs [11]-[13]. [14] aims to protect a scan chain by requiring several keys to be scanned into the chain over several cycles during a test initialization phase. The authors of [15] investigated the effect that on-chip DFT hardware, such as response compaction, X-masking etc., could have on the information made available to an attacker and the need for countermeasures. Finally, [16] proposes an open circuit deadlock ("OCD") cell that inserts an open into the scan chain if a SecureRST signal has not been asserted by key checker function hardware.

The IEEE standard 1687 was created to enable efficient access to this hidden content (e.g., embedded instruments, data, keys, etc.) by allowing the scan chain that accesses hidden content to be dynamically reconfigured by opening new chain segments. Unlike IEEE 1149.1, which is instruction-based, this dynamic reconfiguration is controlled by the data shifted through the scan network. For example, FIG. 1 shows a block diagram of a generalized JTAG and IEEE 1687 architecture 100 to access hidden content. The test access port ("TAP") controller 102 receives a test data input ("TDI") signal 104, a test mode select ("TMS") signal 106, a test clock ("TCK") signal 108, and provides a test data output ("TDO") signal 110 (collectively referred to as TAP signals 112). The TAP controller 102 accesses scan cell circuit(s) 114 that provide access to the Test Data Register(s) (TDR) 116 of the hidden content(s) 118.

Although IEEE 1687 supports multiple hardware architectures (i.e., scan cell circuits) through its description language, the network reconfiguration is often controlled by segment insertion bits (SIBs) that allow additional areas of the scan network to be accessed when the correct value is clocked into the SIB's Update cell. For example, FIG. 2 shows a prior art SIB circuit as shown and described in U.S. Pat. No. 8,881,301 (FIG. 5).

Although companies may not object to end users accessing some types of instruments, access to others, such as sensors, trace buffers, scan-dump, and configuration hardware, may be a threat to on-chip IP or safety. Information such as chip IDs and encryption keys should also be made inaccessible to attackers. Alternative methods of protecting instruments in an IEEE 1687 network from unauthorized access are needed.

Often, an attacker with no specific knowledge of the network will scan random data or specific patterns (e.g. walking a one) through it, and will observe the effect on circuit behavior and data captured in the scan cells. In an unprotected IEEE 1687 network, this strategy will allow the attacker to quickly open all SIBs and map the network architecture, obtaining access to all embedded instruments attached to the network.

Accordingly, there is a need to provide better protection of hidden content in integrated circuits from unauthorized access.

SUMMARY OF THE INVENTION

The present invention provides various circuits and methods to provide better protection of hidden content (e.g., embedded instruments, data, keys, etc.) in integrated circuits from unauthorized access.

More specifically, one embodiment of the present invention provides an integrated circuit having one or more hidden content, a first scan cell circuit connected to at least one of the one or more hidden content, and a second scan cell circuit connected to the first scan cell circuit. The first scan cell circuit and the second scan cell circuit form all or part of a serial data path. The first scan cell circuit provides access to the at least one of the one or more hidden content whenever the first scan cell circuit is in a first specified state and prevents access to the at least one of the one or more hidden content whenever the first scan cell circuit is in a different state than the first specified state. The first scan cell circuit does not interrupt the serial data path when the first scan cell circuit is in the different state. The second scan cell circuit changes an operational characteristic of the first scan cell circuit whenever the second scan cell circuit is in a second specified state.

In another embodiment, the integrated circuit may include one or more hidden content, a scan cell circuit connected to at least one of the one or more hidden content, an update cell connected to the scan cell circuit, and one or more key bits connected to the scan cell circuit. The scan cell circuit provides access to the at least one of the one or more hidden content whenever the scan cell circuit is in a specified state and prevents access to the at least one of the one or more hidden content whenever the scan cell circuit is in a different state than the specified state. The scan cell circuit requires clocking of a correct update value in the update cell and a correct key value in each of one or more key bits to change the scan cell circuit to the specified state, the different state, or both the specified state and the different state.

In yet another embodiment, the integrated circuit includes one or more hidden content, a scan cell circuit connected to at least one of the one or more hidden content, and a detection circuit connected to the scan cell circuit. The scan cell circuit provides access to the at least one of the one or more hidden content whenever the first scan cell circuit is in a specified state and prevents access to the at least one of the one or more hidden content whenever the first scan cell circuit is in a different state than the specified state. The detection circuit automatically changes the scan cell circuit to the different state if the scan cell circuit is in the specified state or prevents the scan cell circuit from being in the specified state whenever one or more conditions are detected.

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
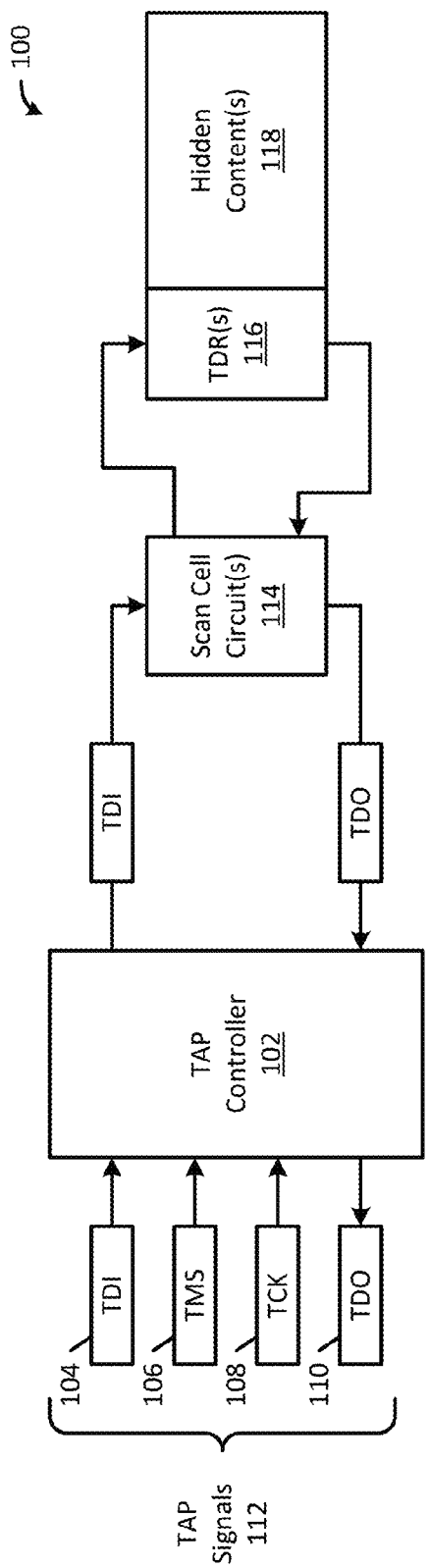
FIG. 1 shows a block diagram of a generalized JTAG and IEEE 1687 architecture to access hidden content in accordance with the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention will be described below in reference to IEEE 1687 scan cell circuits, but the present invention is applicable to other types of scan cell circuits. Traditional scan cell circuits are elements of the scan chain and do not alter the scan chain. IEEE 1687 and 1149.1-2013 scan cell circuits allow the scan chain to be altered to provide or remove access to additional segments of the scan chain and/or hidden content. As a result, the present invention can be incorporated into a network containing traditional scan cell circuits, IEEE 1687 scan cell circuits, IEEE 1149.1-2013 scan cell circuits, newly developed scan cell circuits or any combination thereof.

To prevent an attacker from quickly opening all segment insertion bits ("SIBs") and mapping the network architecture, obtaining access to all embedded instruments attached to the network, Locking SIBs ("LSIBs") were introduced in U.S. Pat. No. 8,881,301. LSIBs use data that is naturally scanned through the network as key bits that must be set to the correct value for the corresponding LSIB to open. As the scan chain length and the number of key bits increases, the expected time required for an attacker to unlock an LSIB increases dramatically.

The concept of Trap bits was also introduced in U.S. Pat. No. 8,881,301. Trap bits, if tripped by an attacker, can prevent him from opening an LSIB even if the correct key is found, and [1] briefly considered the effect of hierarchical network architectures on LSIB security. (Keys are enablers; Traps are disablers.) However, there are many optimizations to a secure IEEE 1687 network protected by LSIBs that were not explored in [1]. For example, responses that an attacker receives from his manipulation of the network can provide misleading information that encourages the attacker to pursue fruitless exploration paths. Other optimizations may reduce or eliminate the transfer of information to the attacker.

The present invention builds on the LSIBs introduced in U.S. Pat. No. 8,881,301, and shows how relatively inexpensive modifications to the IEEE 1687 scan network can make the feedback obtained by an attacker less useful. The following discussion describes the impact that honeytraps, naturally-open LSIBs, and other techniques can have on the expected time required for an attacker to find a hidden instrument behind a particular LSIB.

Various inventions based on U.S. Pat. No. 8,881,301 will now be described in reference to FIGS. 3-6. U.S. Pat. No. 8,881,301 and pending application(s) claiming priority thereto are assigned to Asset InterTech, Inc., which is a co-assignee of the present application. Moreover, the inventors of U.S. Pat. No. 8,881,301 are co-inventors of the present invention. The contents of U.S. Pat. No. 8,881,301 are hereby incorporated by reference in its entirety.

Figure 3:
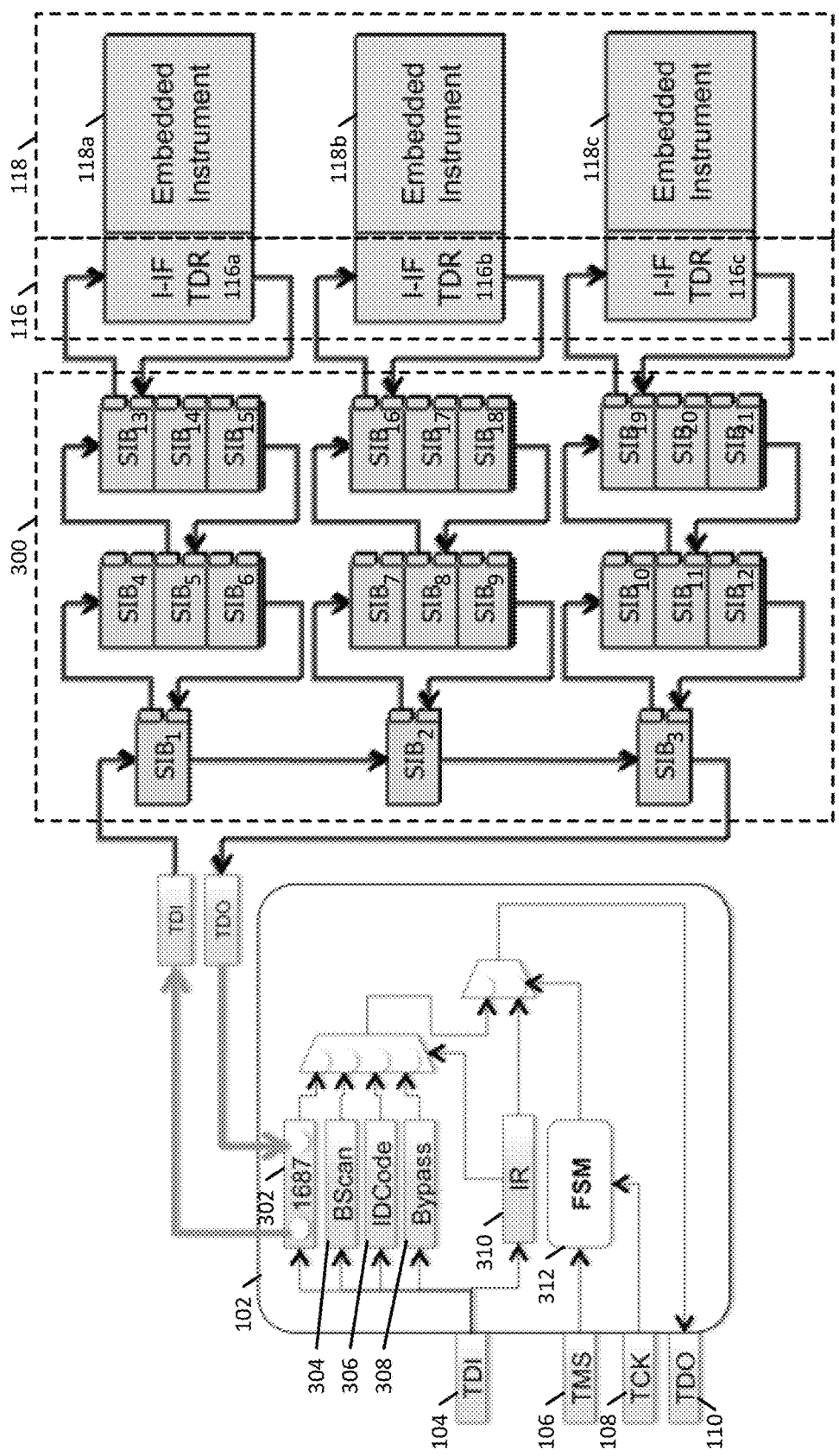
FIG. 3 is a block diagram of a hierarchical IEEE 1687 network accessed with an IEEE 1149.1 TAP controller as shown in U.S. Pat. No. 8,881,301.
Figure 4:
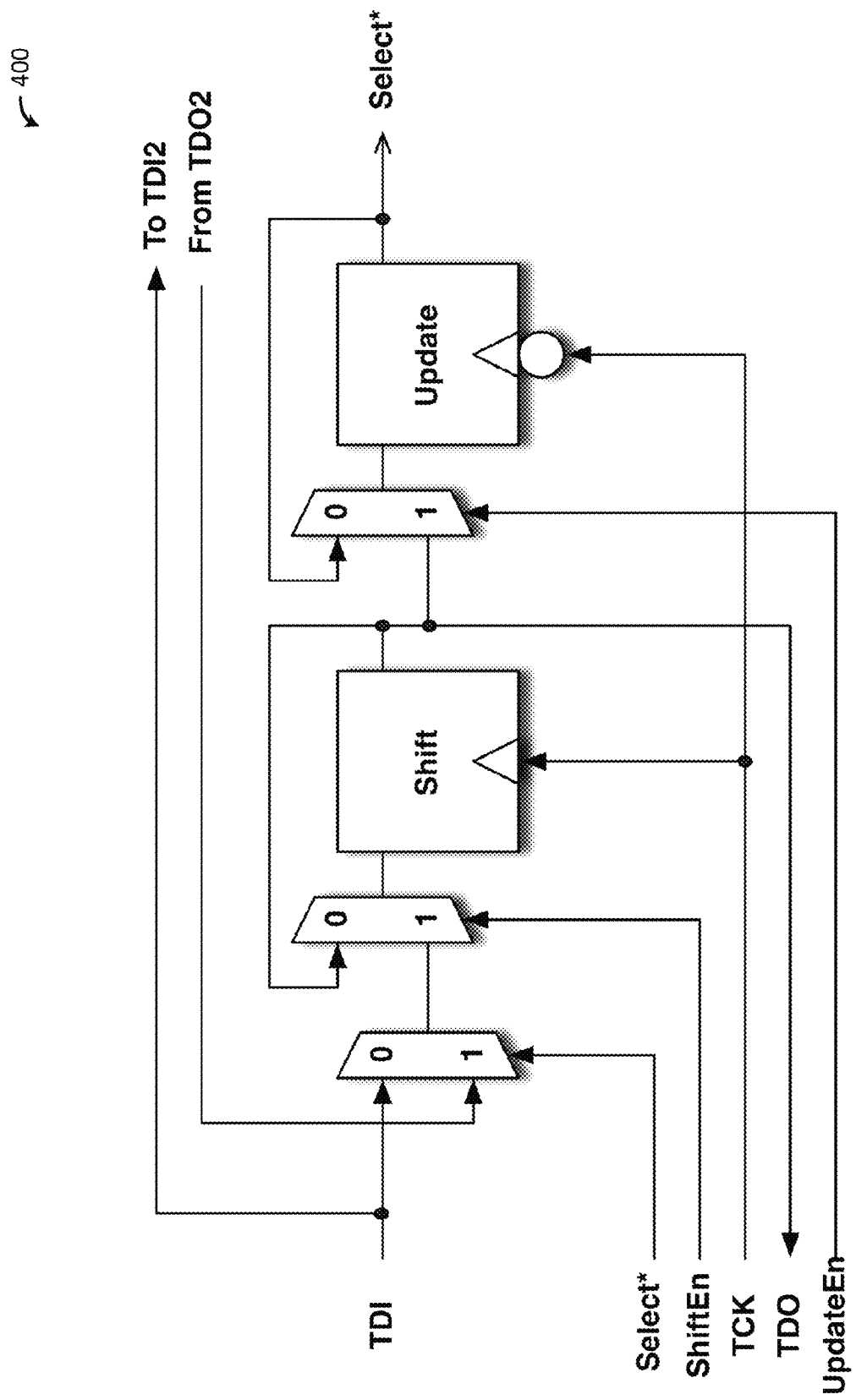
FIG. 4 is a block diagram of a standard SIB implementation as shown in U.S. Pat. No. 8,881,301.

Now referring to FIGS. 3 and 4, a block diagram of a hierarchical IEEE 1687 scan network 300 that allows access to embedded instruments 118 by opening and closing SIBs is shown. An example of a standard SIB implementation 400 used in the hierarchical IEEE 1687 scan network 300 is shown in FIG. 4. When a SIB is open, it allows access to a new segment of the scan network 300. When the SIB is closed, it bypasses that segment, making the overall scan path shorter. Accessing each instrument 118a, 118b or 118c requires opening 3 SIBs. [1]

As used herein, an open scan cell circuit gives, allows or provides access to any hidden content, scan cell chains or networks protected by the scan cell circuit. In other words, the scan cell circuit is a gateway that is either open or closed. Unlike [16], an open scan cell circuit does not interrupt the serial data path. A closed scan cell circuit prevents access to any hidden content, scan cell chains or networks protected by the scan cell circuit. For example, if $SIB_1$ is closed, $SIB_2$ is closed and $SIB_3$ is closed, the serial data path only includes $SIB_1$, $SIB_2$ and $SIB_3$. If, however, $SIB_1$ is open, $SIB_4$, $SIB_5$ and $SIB_6$ are inserted into the serial data path. If $SIB_5$ is also open, $SIB_{13}$, $SIB_{14}$ and $SIB_{15}$ are inserted into the serial data path. If $SIB_{13}$ is also open, TDR 116a is inserted into the serial data path and access to embedded instrument 118a is provided. As a result, accessing embedded instrument 118a requires opening $SIB_1$, $SIB_5$ and $SIB_{13}$.

The IEEE 1149.1 TAP controller 102 for an IEEE 1687 network 300 includes several items, such as one or more IEEE 1687 gateway registers 302, a boundary scan register 304, a standardized identification code register 306, a bypass register 308, an instruction register 310, and an IEEE 1149.1 finite state machine 312 that dictates the sequence and event-order of operations conducted by the registers. The IEEE 1687 gateway register 302 provides access to the IEEE 1687 network 300 and the embedded instruments 118 within. Opening and closing the SIBs can dynamically reconfigure the IEEE 1687 network 300.

When the SIB 400 is closed, the value in the Update cell and thus the value of both Select* signals is equal to 0. (The Select* signals are connected.) When closed, data passes from the TDI input to the shift cell, and from the shift cell to TDO on the rising-edge of TCK when the IEEE 1149.1 state machine is in the ShiftDR state (ShiftEn=1). If all the SIBs in FIG. 3 were closed, the IEEE 1687 scan network 300 would appear to contain only three scan cells, the three SIBs on the far left of the hierarchy. To allow access to a new area of the network 300, including the embedded instruments 118, one or more SIBs must be opened. For example, accessing the instrument 118a requires opening 3 SIBs.

Figure 2:
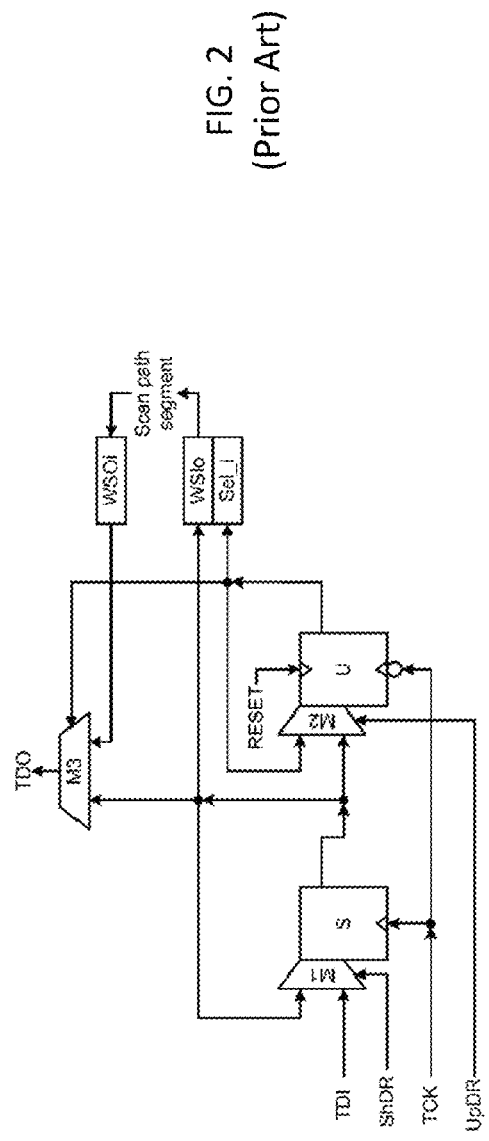
FIG. 2 shows a block diagram of an exemplary SIB circuit in accordance with the prior art.

Opening the SIB 400 occurs when a value of 1 is clocked into the Update Register on the falling edge of TCK when the 1149.1 state machine is in the UpdateDr state (UpdateEn=1). This allows Select* to be set to 1. The Select* serves as an enable for cells in the new chain segment between TDI2 and TDO2. The value from TDO2 will be clocked into the shift cell when the IEEE 1149.1 state machine is in the ShiftDR state, and the data at the TDI input will be passed to the new chain segment through TDI2. Once a new value is put in the Update cell, that value remains until the state machine again executes an UpdateDR or until Global Reset is asserted. Also note that the SIB 400 is only one example of a SIB. Other variations (such as opening the SIB when the Update Cell is equal to 0 or inserting the new chain after the SIB as in FIG. 2) are possible.

IEEE 1687 is especially useful for handling large numbers of instruments that would be difficult under normal IEEE 1149.1. For example, an IEEE 1687 serial access network may contain 200 memory BISTs, each behind a SIB, and the BISTs may be organized by SIBs into 20 groups of 10. The initial (minimum) scan path would be 20 bits long. When one SIB is opened, it adds 10 SIBs to the scan path, and when one of those SIBs is opened, it provides access to the BIST Interface Test Data Register (TDR). This architecture allows any selection of BISTs to be accessed and operated simultaneously, allowing adjustments in real-time to fit within power, noise, or thermal budgets.

Figure 5:
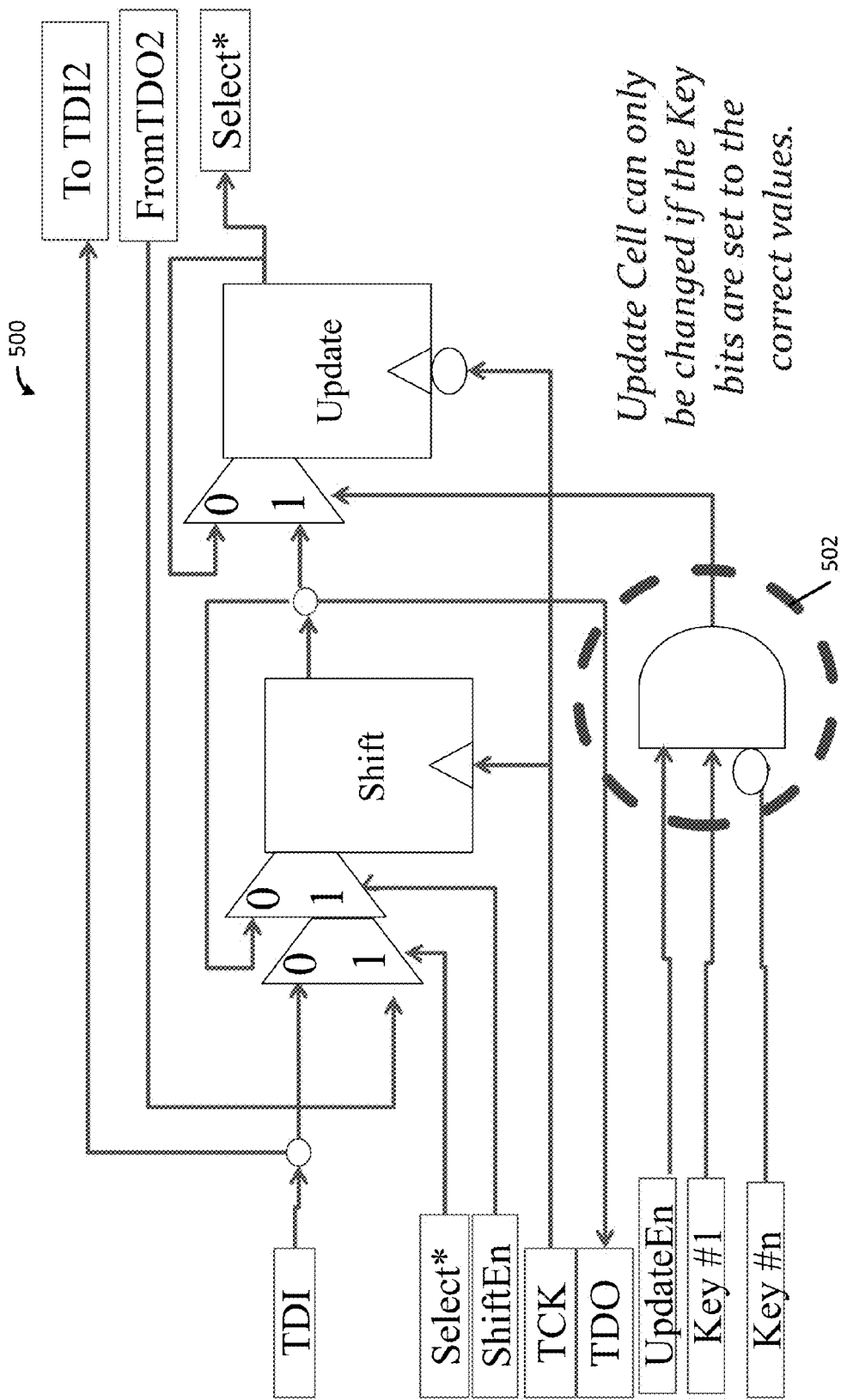
FIG. 5 is a block diagram of a locking SIB implementation based on U.S. Pat. No. 8,881,301.

Referring now to FIG. 5, a locking SIB ("LSIB") 500 based on U.S. Pat. No. 8,881,301 is shown. The LSIB 500 is created from a SIB 400 (FIG. 4) by gating the Update signal, UpdateEn, with a set of n key bits ("Key #1" through "Key #n"). The key bits correspond to values in other predefined scan cells in the IEEE 1687 network or other sources as will be described below. Opening an LSIB 500 requires not only clocking the correct value into the Update cell, but also scanning the correct data into the key bits in the chain. Note that although FIG. 5 shows a set of key bits AND'ed together (see circle 502) that would appear on every chip instance, it is possible to use E-fuses or programmable logic to make the conditions required for an LSIB to open vary from one chip to another. Note also that other types of logic circuits can be used to accomplish the same functionality.

Although IEEE 1687 does not mandate that an IEEE 1149.1 TAP controller drive the scan control signals, in many cases an IEEE 11491.1 TAP is likely to be used, and an attacker may need to utilize the IEEE 1149.1 state machine to execute capture, shift, and update functions. The following discussion will assume control of an IEEE 1687 network through an IEEE 1149.1 TAP. This means that multiple clock cycles are required to execute guesses that involve filling the chain with random data, assert control signal UpdateDR (Update Data Register), and then check the length of the chain. Note that changing the protocol by which the IEEE 1687 network is accessed will change details about how guesses are made and how long they will take, but the present invention will still be applicable.

Figure 6:
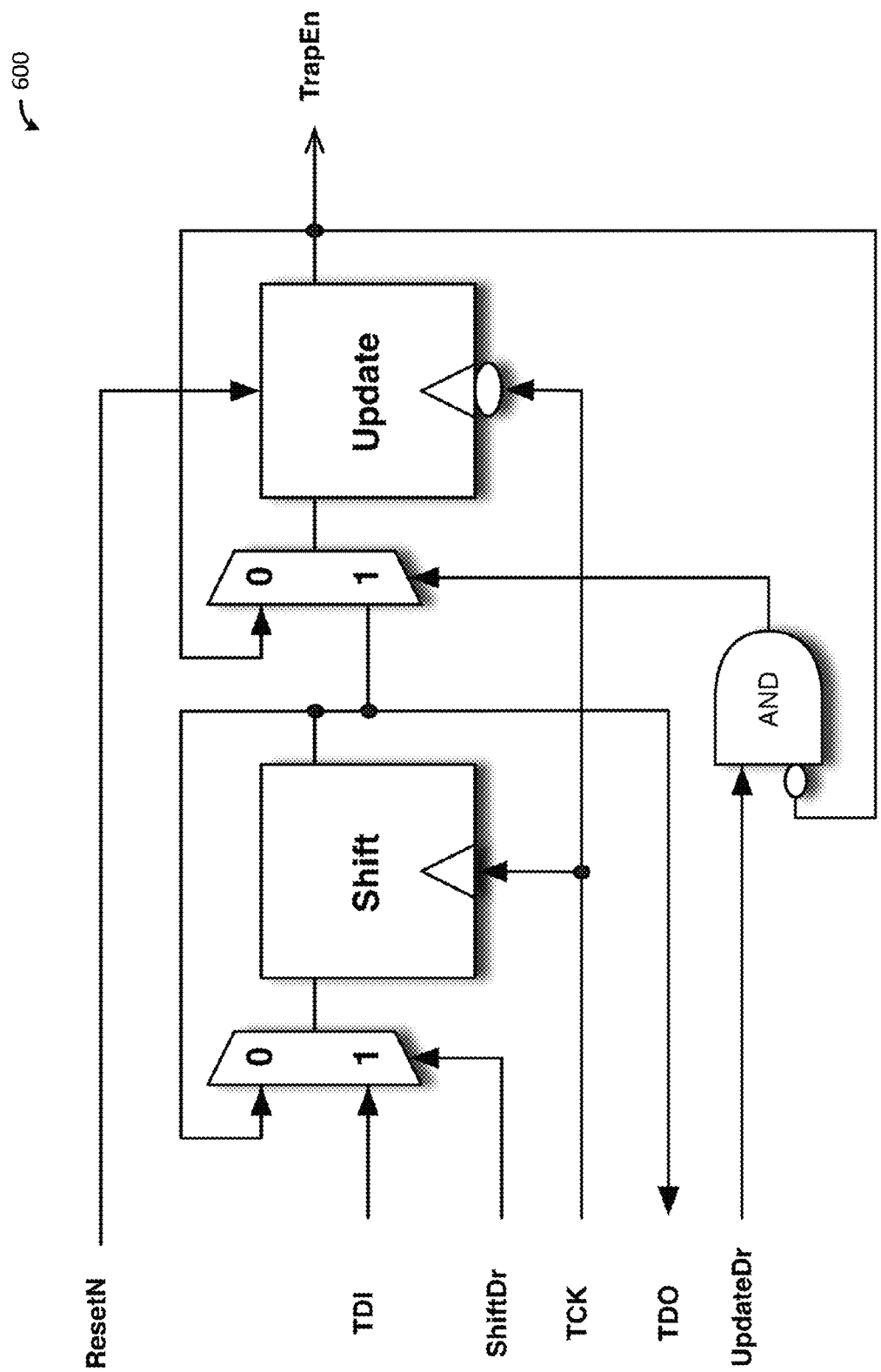
FIG. 6 is a block diagram of a SIB implementation having a trap bit based on U.S. Pat. No. 8,881,301.

Now referring to FIG. 6, a SIB having a trap bit 600 is shown. Trap bits were also introduced in U.S. Pat. No. 8,881,301. A trap bit asserts a Trap-Enable signal when the trigger value is written to the bit's Update cell. For example, a positive logic TrapEn signal may be inverted and fed into the AND gate shown in FIG. 5 to keep the target SIB or LSIB that hides an instrument from ever opening. The trap bit logic contains internal feedback so that once the trap is asserted, it can only be de-asserted by asserting reset. If the trap bit is reset using the 1149.1 Test Logic Reset ("TLR") state, this effectively doubles the expected time for an attacker to open an LSIB by requiring a pass through the TLR state at the start of every guess to clear all possible previously tripped traps. The actual time will vary depending on details regarding how the instruction register is refilled (if it has to be) and the relative lengths of the chains.

In [1], it was assumed that an attacker would enter a random vector into the scan chain as a "guess" to try to open an unknown LSIB. Without knowledge of the network, a random guess is likely to be among the best choices, as it reduces bias. The network interrogation process would check the chain length after each guess, and an increase in length would indicate that a new chain segment had opened—potentially providing new access to additional instrument TDRs (test data registers), LSIBs, or keys. Leaving aside the possibility of power analysis, imaging, or physical delamination of the part, the attacker is faced with a black box problem and limited to observing data exiting the chip pins. The most visible feedback is to note a change in the length of the scan path. Various embodiments of the present invention reduce the information present in such feedback by making it complicate the attacker's strategy or by removing that feedback entirely.

Figure 7:
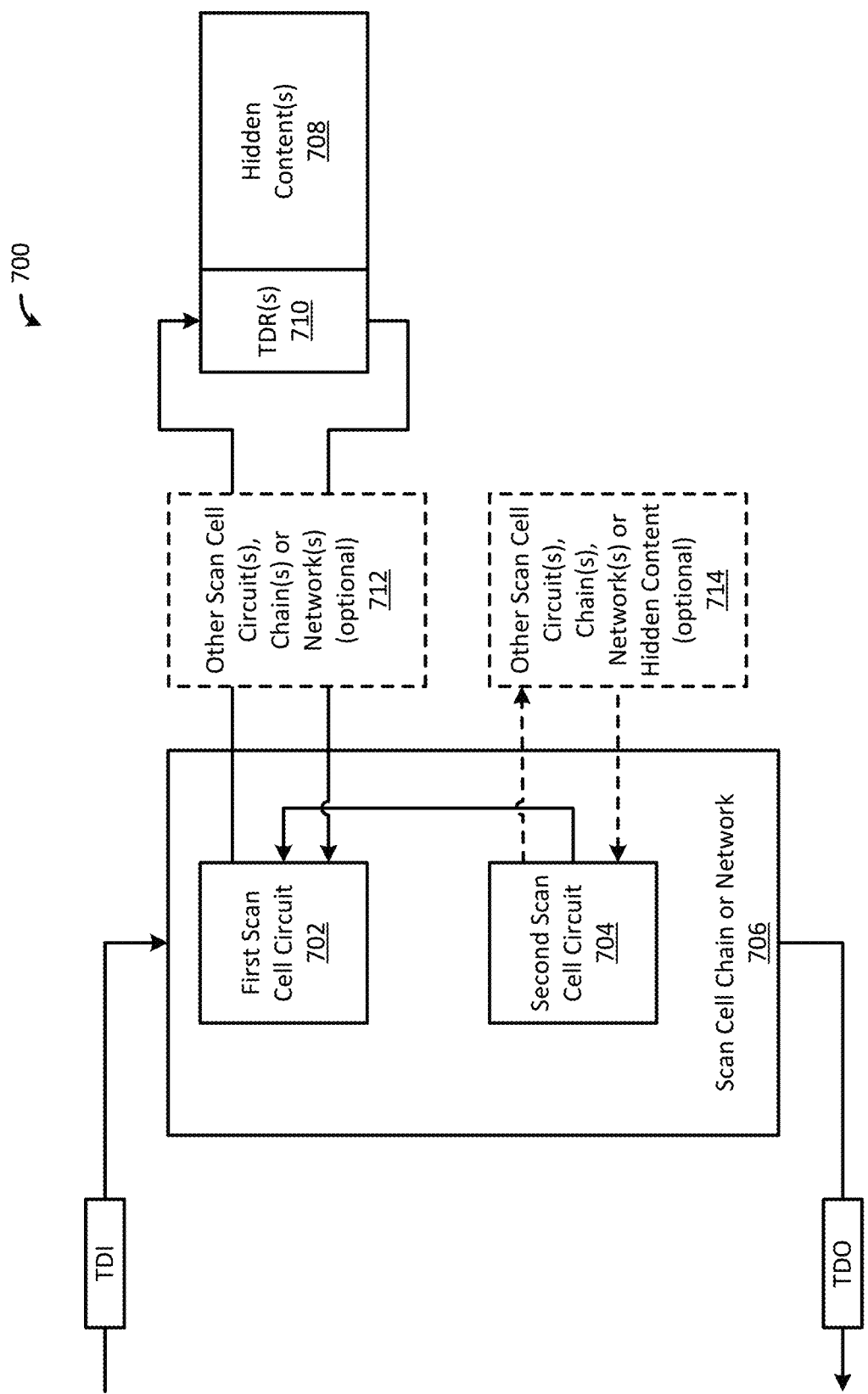
FIG. 7 is a block diagram of an integrated circuit 700 in accordance with one embodiment of the present invention.

Referring now to FIG. 7, a block diagram of an integrated circuit 700 in accordance with one embodiment of the present invention is shown. The integrated circuit 700 includes a first scan cell circuit 702 and a second scan cell circuit 704. The first scan cell circuit 702 and the second scan cell circuit 704 form all or part of a serial data path between TDI and TDO. The first scan cell circuit 702 and the second scan cell circuit 704 can be the only scan cell circuits or be part of a scan cell chain or network 706. Note that the first scan cell circuit 702 and the second scan cell circuit 704 can be sequentially located within the serial data path or located in different parts of the serial data path. For example, the first scan cell circuit 702 can be part of a first chain of scan cell circuits, and the second scan cell circuit 704 can be part of a second chain of scan cell circuits. Moreover, the first scan cell circuit 702 and the second scan cell circuit 704 can be at different levels within a hierarchical network of scan cell circuits 706.

Regardless of the configuration, the first scan cell circuit 702 is connected to at least one of the one or more hidden content 708 accessible through a TDR 710, and provides access to the at least one of the one or more hidden content 708 whenever the first scan cell circuit 702 is in a first specified state and prevents access to the at least one of the one or more hidden content 708 whenever the first scan cell circuit 702 is in a different state than the first specified state. The first scan cell circuit 702 provides access to the at least one of the one or more hidden content 708 by inserting the at least one of the one or more hidden content 708 into the serial data path, and prevents access to the at least one of the one or more hidden content 708 by removing the at least one of the one or more hidden content 708 from the serial data path. Note that the first scan cell circuit 702 does not interrupt the serial data path when the first scan cell circuit 702 is in the different state. In addition, the second scan cell circuit 704 is connected to the first scan cell circuit 702 such that the second scan cell circuit 704 changes an operational characteristic of the first scan cell circuit 702 whenever the second scan cell circuit 704 is in a second specified state. In one example, the first specified state is open, the second specified state is open, and the different state is closed. In another example, the first specified state is open, the second specified state is closed, and the different state is closed. In yet another example, changing the second scan cell circuit 704 to the second specified state requires fewer process steps or correct inputs than changing the first scan cell circuit 702 to the first specified state.

Other scan cell circuits, chains or networks 712 can be connected between the first scan cell circuit 702 and the at least one of the one or more hidden content 708. Similarly, the second scan cell circuit 704 can also be connected to other scan cell circuits, chains, networks or hidden content 714. In this case, the second scan cell circuit 704 provides access to other scan cell circuits, chains, networks or hidden content 714 whenever the second scan cell circuit 704 is in the first specified state and prevents access to the other scan cell circuits, chains, networks or hidden content 714 whenever the second scan cell circuit is in the different state. In some embodiments, a first hidden content 708 contains a first data that is useful in an operation of the integrated circuit, and a second hidden content 714 contains a second data that is not useful in the operation of the integrated circuit. The first hidden content 708 may have a first interface size and the second hidden content 714 may have a second interface size, which can be equal to the first interface size.

The second scan cell circuit 704 can change the operational characteristic of the first scan cell circuit 702 in a variety of ways. For example, the second scan cell circuit 704 can disable the first scan cell circuit 702 by: (1) preventing the first scan cell circuit 702 from changing to the first specified state, or the different state, or both the first specified state and the different state; or (2) immediately changing the first scan cell circuit 702 to the different state if the first scan cell circuit 702 is in the first specified state and preventing the first scan cell circuit 702 from changing to the first specified state.

To prevent a hacker from operating a JTAG scan path at its full potential frequency, delay-inducing honeytrap/naturally open LSIBs could be added to slow the speed at which attack guesses can be made. For example, opening or closing such an LSIB could place an intentionally slow scan path segment in the path that will force the scan path to operate at a much slower frequency, such as 1 MHz. This slowing of the scan network could be present when the delay-inducing LSIB is in a particular state (e.g. opened or closed), or when a group of LSIBs is in a particular state (or set of states.) In addition, opening/closing delay-inducing honeytraps or naturally-open LSIBs over multiple guesses could incrementally increase the delay imposed on the scan shift frequency-storing the delay-inducing state in a register that only resets on power-up, for example. Accordingly, second scan cell circuit 704 can change the operational characteristic of the first scan cell circuit 702 by causing a delay in changing the first scan cell circuit 702 to the first specified state, or the different state, or both the first specified state and the different state. In some embodiments, the delay can be incrementally increased, or the first scan cell circuit 702 can only be changed to the first specified state after the second scan cell circuit 704 causes the delay.

The attacker can also be forced to scan at a slower frequency to open a target LSIB protecting hidden content, reducing the frequency at which he can apply his guesses. For example, in this case, the scan path could be hierarchical, where one LSIB must be opened to achieve access to the more critical LSIB, and the opening of this first LSIB intentionally slows down the scan path or the TCK by some means. Accordingly, the second scan cell circuit 704 can change the operational characteristic of the first scan cell circuit 702 by causing the first scan cell circuit 702 or another circuit connected to the first scan cell circuit 702 or another circuit within the serial data path to operate at a slower scan shift frequency. In some embodiments, the slower scan shift frequency is incrementally decreased, or the first scan cell circuit 702 can only be changed to the first specified state after the second scan cell circuit 704 causes the slower scan shift frequency. Another way to change the operational characteristic of the first scan cell circuit 702 is to introduce a required change in a shift path voltage of the first scan cell circuit 702 or another circuit connected to the first scan cell circuit 702 or another circuit within the serial data path. In some embodiments, the first scan cell circuit 702 can only be changed to the first specified state after the second scan cell circuit 704 introduces the required change in the shift path voltage of the first scan cell circuit 702 or another circuit connected to the first scan cell circuit 702 or another circuit within the serial data path.

The time-period associated with the length of time or the number of scans allowed with an LSIB while it is opened is key to the strategy of protection and the protection metric (how hard is it to break the security). In some cases, it is better to open an LSIB and to leave it open so that the key bits must be input correctly for the LSIB to close—for example, if the LSIB provides access to a honeytrap, keeping the LSIB open may help to keep the effect of the honeytrap asserted. In other cases, it may be better to restrict the length of time that an LSIB may remain open—for example, if an LSIB provides access to a scan path with 20 other LSIBs, then limiting the investigation potential to only 5 scans and updates before closing the LSIB and forcing the attacker to determine how to open the main LSIB again, can limit the attacker's ability to easily find the keys and/or sequence of operations required to open the LSIBs and access the hidden content. This is especially true if the correct key bits change for the LSIB once it is automatically closed or after a certain number of scan cycles have passed.

Accordingly, the second scan cell circuit 704 can change the operational characteristic of the first scan cell circuit 702 by automatically changing the first scan cell circuit 702 to the different state if the first scan cell circuit 702 is in the first specified state, or prevents the first scan cell circuit 702 from being in the first specified state whenever one or more conditions are detected. The one or more conditions may include a circuit reset, a specified data from a real time clock, a specified time period since the first scan cell circuit was changed to the first specified state, a specified number of clock cycles since the first scan cell circuit was changed to the first specified state, a specified number of shift cycles since the first scan cell circuit was changed to the first specified state, a specified number of shift-update cycles since the first scan cell circuit was changed to the first specified state, a specified number of capture cycles since the first scan cell circuit was changed to the first specified state, a specified number or set of shift signal toggles, a specified number of capture signal toggles, a specified number of update signal toggles, a specified configuration of voltage domains, a data read or produced by an embedded instrument, a specified data obtained from a geographic location signal, a data obtained from a wireless connection, a data obtained from one or more inputs of the integrated circuit, a specified number of clock cycles while the integrated circuit is in a specified state, a specified toggle sequence of one or more control signals with a clock signal is held at a specified state, or a combination thereof.

As will be described in some examples below, the first scan cell circuit 702 can be a first segment insertion bit circuit or a first locking segment insertion bit circuit. Likewise, the second scan cell circuit 704 can be a second segment insertion bit circuit, a second locking segment insertion bit circuit, a honeytrap locking segment insertion bit circuit, or a set of second scan cell circuits (see FIG. 10). If the second scan cell circuit 704 is a set of second scan cell circuits, the set of second scan cell circuits change an operational characteristic of the first scan cell circuit 702 unless the set of second scan cell circuits have a specified status. For example, the specified status can be opening or closing one or more of the set of second scan cell circuits in a specified sequence, or two or more of the set of second scan cell circuits being open, closed, or a combination thereof at once. The set of second scan cell circuits may trigger a trap if the specified status is not correctly performed. In addition, the set of second scan cell circuits may include a honeytrap locking segment insertion bit circuit, a naturally open locking segment insertion bit circuit, etc. The one or more hidden content 708 or 714 can be one or more embedded instruments, or keys, or traps, or serial registers, or data.

Note that in some embodiments, the second scan cell circuit 704 can be eliminated and the state of the first scan cell circuit 702 can be controlled by other circuits or techniques. For example, the integrated circuit may include one or more hidden content, a scan cell circuit connected to at least one of the one or more hidden content, an update cell connected to the scan cell circuit, and one or more key bits connected to the scan cell circuit. The scan cell circuit provides access to the at least one of the one or more hidden content whenever the scan cell circuit is in a specified state and prevents access to the at least one of the one or more hidden content whenever the scan cell circuit is in a different state than the specified state. The scan cell circuit requires clocking of a correct update value in the update cell and a correct key value in each of one or more key bits to change the scan cell circuit to the specified state, the different state, or both the specified state and the different state.

In another example, the integrated circuit includes one or more hidden content, a scan cell circuit connected to at least one of the one or more hidden content, and a detection circuit connected to the scan cell circuit. The scan cell circuit provides access to the at least one of the one or more hidden content whenever the first scan cell circuit is in a specified state and prevents access to the at least one of the one or more hidden content whenever the first scan cell circuit is in a different state than the specified state. The detection circuit automatically changes the scan cell circuit to the different state if the scan cell circuit is in the specified state or prevents the scan cell circuit from being in the specified state whenever one or more conditions are detected. The one or more conditions can be a circuit reset, a specified data from a real time clock, a specified time period since the scan cell circuit was opened, a specified number of clock cycles since the scan cell circuit was opened, a specified number of shift cycles since the scan cell circuit was opened, a specified number of shift-update cycles since the scan cell circuit was opened, a specified number of capture cycles since the scan cell circuit was opened, a specified number or set of shift signal toggles, a specified number of capture signal toggles, a specified number of update signal toggles, a specified configuration of voltage domains, a data read or produced by an embedded instrument, a specified data obtained from a geographic location signal, a data obtained from a wireless connection, a data obtained from one or more inputs of the integrated circuit, a specified number of clock cycles while the integrated circuit is in a specified state, a specified toggle sequence of one or more control signals with a clock signal is held at a specified state, or a combination thereof.

Providing Unclear Positive Feedback: Honeytraps

Opening an LSIB and observing an increase in chain length is likely to be seen as a positive result by an attacker because more of the network is available. This can be taken advantage of by including honeytrap LSIBs ("HTLSIBs") in the network, where a HTLSIB is a network element that encourages the attacker to repeatedly make poor decisions that prevent him from accessing hidden instruments. The "honeytrap" term arises from honeypots used in internet security to counteract attacks [17].

Figure 8:
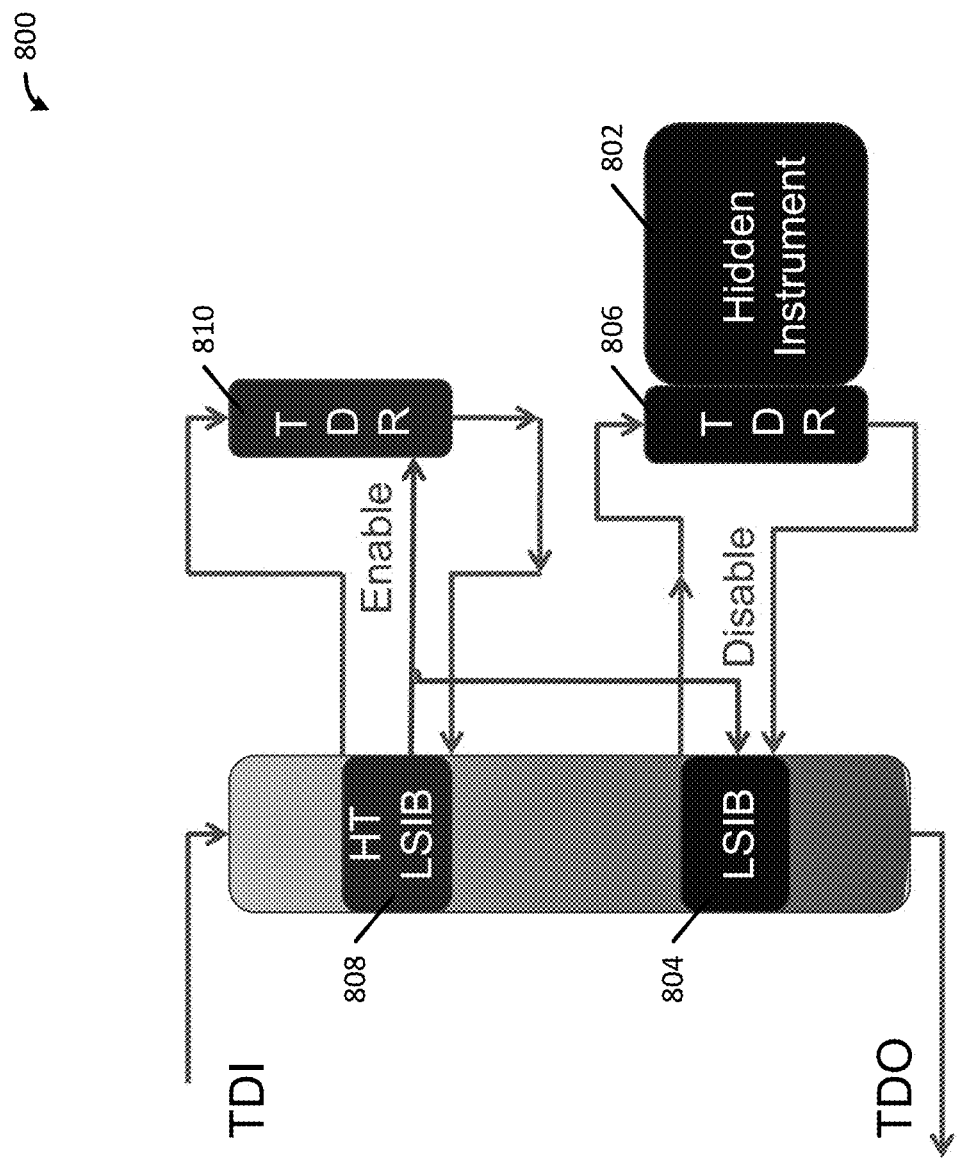
FIG. 8 is a block diagram of a honeytrap LSIB in accordance with one embodiment of the present invention.

Referring now to FIG. 8, a block diagram of a honeytrap LSIB network architecture 800 in accordance with another embodiment of the present invention is shown. Although FIG. 8 uses LSIBs, the present invention can use other types of scan cell circuits. The honeytrap LSIB network architecture 800 includes a hidden content (e.g., embedded instrument 802, keys, data, etc.) and a first scan cell circuit (e.g., LSIB 804) that is connected to the hidden content 802 via TDR 706. The first scan cell circuit (e.g., LSIB 804) provides access to the hidden content 802 whenever the first scan cell circuit (e.g., LSIB 804) is open and not disabled. Note that the disable signal can physically close an LSIB 804, or it can just act as a disable on the key bits to prevent it from opening (but not close it later). The second scan cell circuit (e.g., HT LSIB 808) is connected to the first scan cell circuit (e.g., LSIB 804) and a TDR 810 that may or may not be connected to anything else. The second scan cell circuit (e.g., HT LSIB 808) disables the first scan cell circuit (e.g., LSIB 804) whenever the second scan cell circuit (e.g., HT LSIB 808) is open.

Figure 11:
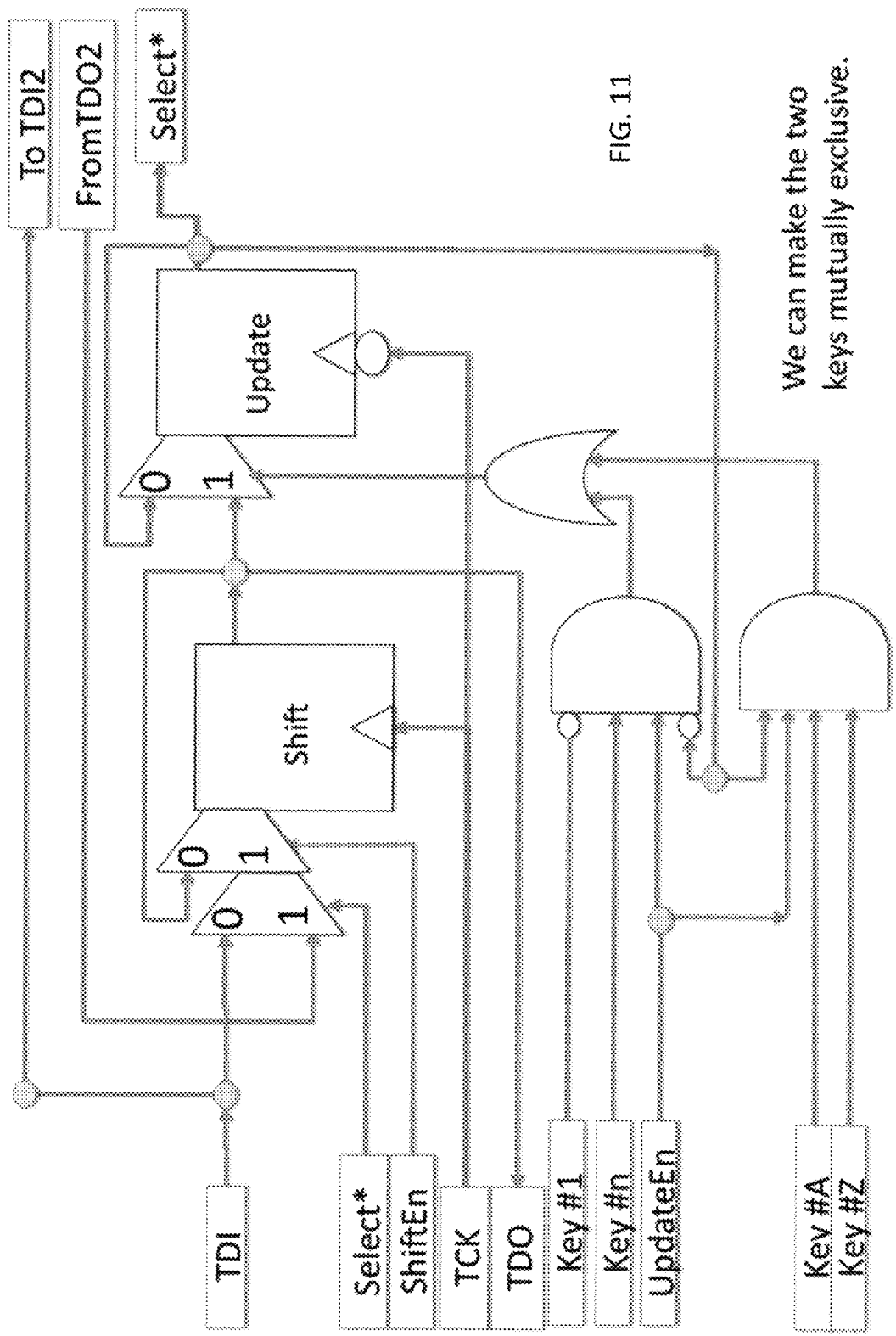
FIG. 11 is a block diagram of a LSIB having mutually exclusive keys for opening and closing the LSIB in accordance with another embodiment of the present invention.

As previously described in reference to FIG. 5, a LSIB 500 is created by adding a circuit 502 to a SIB that requires clocking of a first correct value in an update cell and a second correct value in each of one or more key bits to open the scan cell circuit. Note that the second correct value may involve setting different key bits to different values to successfully open the scan cell circuit, as shown in FIG. 5. In some cases, the segment insertion bit circuit requires a third correct value in each of one or more key bits to close the scan cell circuit. Note that the second correct values can be different for each scan cell circuit as shown in FIG. 11. Moreover, a delay circuit can be connected to the first and second scan cell circuits or to the scan network as a whole. Moreover, small counters or other logic can be inserted into the circuits to require the JTAG machine to go through more than one scan and UpdateDR cycle after Reset before LSIBs will open—thwarting attackers who pull reset after each guess. As previously described in reference to FIG. 3, a network of scan cell circuits can be connected between the first scan cell circuit and the at least one of the one or more hidden content. Likewise, the honeytrap LSIB architecture 800 could be anywhere within the network of scan cell circuits, and the components of the architecture 802 through 808 could be interspersed in the scan cell network intermingled with other scan cell circuits on different layers of the hierarchy.

HTLSIBs could consist of an LSIB that does not provide access to any hidden instruments or keys, but disables a second LSIB whenever the HTLSIB is open. For example, the Select* line that enables a new scan segment accessible through the HTLSIB may be inverted and fed into an AND gating the UpdateEn signal of a different LSIB (such as the AND gate 502 in FIG. 5), preventing the second LSIB from opening whenever the HTLSIB is open. Once the attacker opens the honeytrap, he is likely to want to continue opening it on each guessing attempt because it provides access to a portion of the network that may contain key bits, LSIBs, etc. Instead, only using such guesses ensures that he will never open the target LSIB because the HTLSIB prevents the target LSIB from being opened.

For the HTLSIB to help prevent or delay the opening of a target LSIB, it should be found by the attacker first. If the target LSIB is opened first and not closed, the disabling features of the HTLSIB may become inconsequential especially if the HTLSIB does not automatically close the target LSIB when the HTLSIB is open. The primary driver for increasing the expected time required to open an LSIB is key size, so the number of key bits for the HTLSIB should be low to increase the chances of it being opened early. One could argue that a clever attacker will be able to guess that a HTLSIB is a trap by using the approach specified in [1] to find the exact key and trap bits that relate to the newly opened HTLSIB. An unusually small number of key bits or a small scan network behind the HTLSIB could indicate that this LSIB is indeed a trap and opening it should be avoided. However, this seemingly clever attack strategy can be made less effective if some apparent HTLSIBs are required to open target LSIBs by, for example, placing key bits behind them. Then an attacker who avoids opening all possible/ likely HTLSIBs will not be able to successfully access hidden instruments either. Another embodiment includes one or more naturally open HTLSIBs that induce a mandated slow TCK from the start. The attacker then has to figure out what key closes the naturally open HTLSIB. Since the TCK frequency is slow to begin with, it will take the attacker a very long time, if ever, to figure out how to close them. Once all of the naturally open HTLSIBs are closed, the TCK frequency can be increased significantly.

The potential use of HTLSIBs increases the search space that an attacker must explore. As each LSIB is opened, he must consider that it could be required to be open for any future progress to be made. However, opening it could also make it impossible to make future progress. The number of scenarios grows exponentially as more LSIBs are discovered.

An additional advantage of using additional LSIBs in various honeytrap and naturally-open configuratons is the ability to reduce the susceptibility of the LSIB approach to power analysis attacks. For example, the same physical key bit cells could be used for multiple LSIBs or multiple keys for the same LSIB depending on the previous scan history. Other hardware, such as counters or hidden shift registers that don't lead to TDO, but which hold key bits, trap bits, or other state information may not only provide useful LSIB-related functionality, but may also further obfuscate the information obtained from monitoring the switching activity during scan shift, update, capture, and operation of the scan network.

In one example, the one or more hidden content includes an access circuit that enables or disables one or more voltage domains in the integrated circuit, or a voltage accumulator connected to the one or more voltage domains that determines a current status of the one or more voltage domains. In another example, the integrated circuit includes one or more voltage domains and a specified status of the one or more voltage domains is required to change the first scan cell circuit to the first specified state or the different state, or change the second scan cell circuit to the second specified state or the different state, or both. A voltage accumulator can be connected to the one or more voltage domains to determine a current status of the one or more voltage domains.

Providing Negative Feedback: Closing a Chain

As described above, honeytraps provide positive feedback by opening new areas of the chain. The reverse of that would be to insert LSIBs that are initially open on resetting the circuit, but close when correct key values are scanned into the chain. This could be disturbing to an attacker because it would reduce his access to potential key bits, instrument TDRs, etc. However, this naturally open LSIB (NO LSIB) can be made to disable the target LSIB in its open state. An attacker would need to overcome his natural inclination to not reduce the size of the scan network to open the target LSIB. Furthermore, all NO LSIBs would not need to disable other SIBs in their open state. To make the attacker's job harder, some NO LSIBs could disable other LSIBs in their closed states instead. Because an attacker would not know which condition may be needed to open a target LSIB, he needs to try both.

Figure 9:
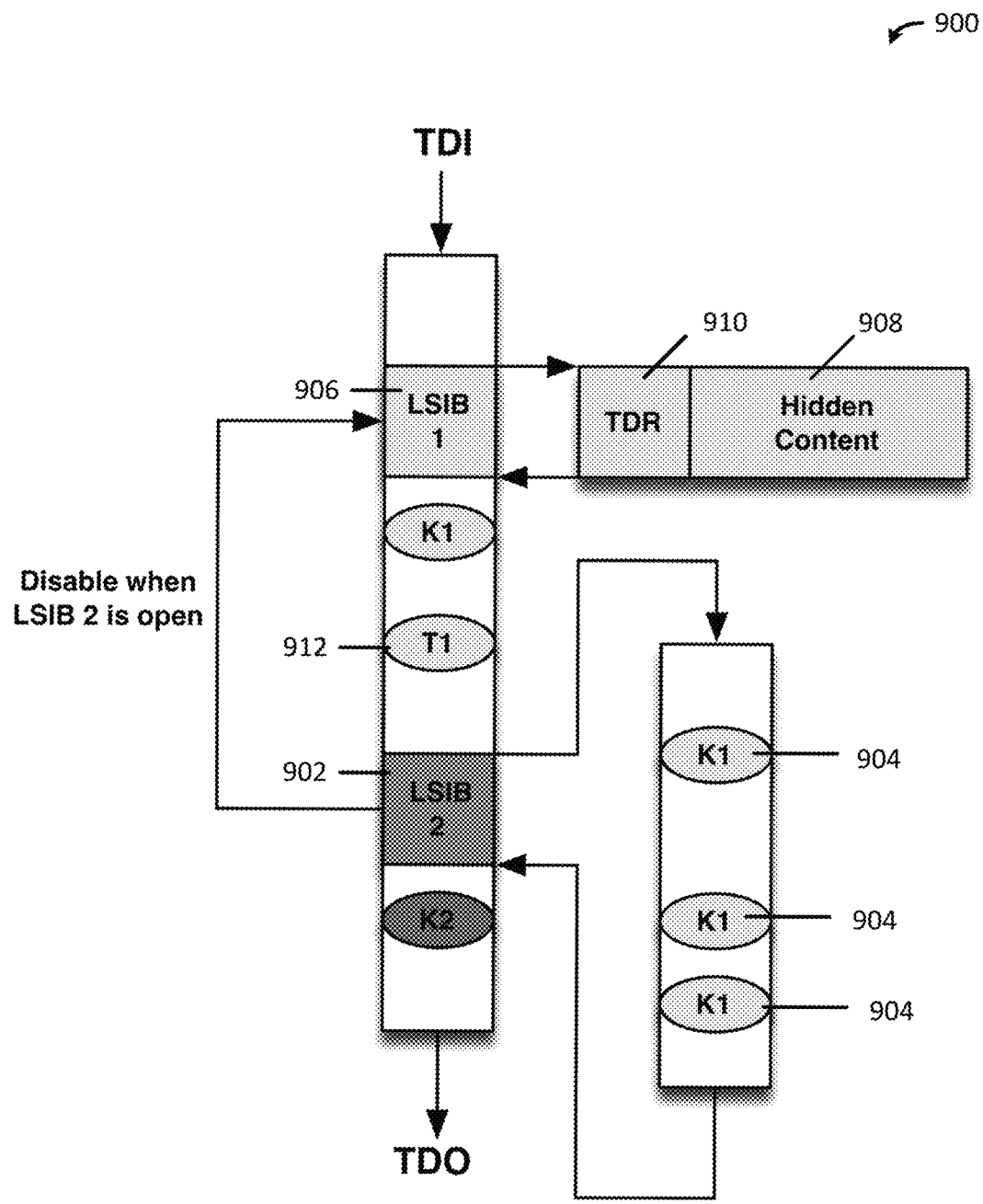
FIG. 9 is a block diagram of a LSIB with keys behind it in accordance with another embodiment of the present invention.

In another embodiment of the present invention and as shown in FIG. 9, LSIB2 902 that allows access to a new network segment may have key bits (K) 904 behind them that have to be set for a target LSIB1 906 (one hiding an instrument 908 via TDR 910) to be opened. However, that same LSIB2 902 may disable another condition required to access the hidden instrument when the second LSIB2 902 is open. For example, the second LSIB2 902 being open could disable the target LSIB1 906 and keep it from opening. Thus, an attacker would have to find the second LSIB2 902, potentially change the key bits 904 behind it, or open other LSIBs behind that and subsequently close one or more LSIBs in the chain before the target LSIB1 906 could be opened. Other variations on this theme are possible. In fact, opening an LSIB deep in the hierarchy and then closing off access to it would be a counterintuitive thing for an attacker to do but can be made mandatory for access. The one or more trap bits 912 may also be used to prevent LSIB1 906 from opening. An advantage of this configuration is that passes would need to be made through the network to set the key bits behind LSIB2 902 and subsequently close LSIB2 902 before LSIB1 906 could be opened (especially if LSIB2 902 were initially closed). This increases the chances of trap 1 912 being tripped.

For example, an integrated circuit 900 includes one or more hidden content 908, a first scan cell circuit 906 and a second scan cell circuit 902 connected to the first scan cell circuit 906. The first scan cell circuit 906 is connected to at least one of the one or more hidden content 908 (e.g., embedded instruments, keys, data, etc.), and provides access to the at least one of the one or more hidden content 908 whenever the first scan cell circuit 906 is open and not disabled. The first and second scan cell circuits can be a first and second segment insertion bit circuit, or a first and second locking segment insertion bit circuit or variations of other scan cell circuits (such as SegSelect circuits). For example, the first scan cell circuit 906 can be a segment insertion bit circuit, a locking segment insertion bit circuit or other suitable type of scan cell circuit. When the first scan cell circuit 906 is a locking segment insertion bit circuit, the second scan cell circuit 902 is connected to a set of key bits 904, and disables the first scan cell circuit 906 unless the set of key bits 904 are set for the first scan cell circuit 906. When the first scan cell circuit 906 is not a locking segment insertion bit circuit, the second scan cell circuit simply disables the first scan cell circuit without any key bits. In another embodiment, the first scan cell circuit can only be opened when the set of key bits are set for the first scan cell circuit and the second scan cell circuit is closed.

Note that the second scan cell circuit can be a honeytrap locking segment insertion bit circuit. Each scan cell circuit further may include a segment insertion bit circuit that requires clocking of a first correct value in an update cell and a second correct value in each of one or more key bits to open the scan cell circuit. Moreover, the segment insertion bit circuit may require a third correct value in each of one or more key bits to close the scan cell circuit. Note that the second correct values can be different for each scan cell circuit. A delay circuit can also be added to the first and second scan cell circuits or enabled by them and attached to the chain as a whole. Moreover, small counters or other logic can be inserted into the circuits to require the JTAG machine to go through more than one scan and UpdateDR cycle after Reset before LSIBs will open—thwarting attackers who pull reset after each guess. A network of scan cell circuits can be connected between the first scan cell circuit and the at least one of the one or more hidden content.

For example, a set of key bits can be connected to the first scan cell circuit, or the second scan cell circuit, or both the first and second scan cell circuits, wherein a correct key value in each of one or more key bits is required to operate the scan cell circuit(s) or access the at least one of the one or more hidden content. An embedded instrument, or a function logic circuit, or a memory, or a register, or a decryption circuit, or an encryption circuit, or a circuit input, or shifted into a serial data path, or a combination thereof can generate the correct key value. An embedded instrument, or a function logic circuit, or a memory, or a register, or a decryption circuit, or an encryption circuit, or a circuit input, or shifted into a serial data path, or a combination thereof can generate a key value clocked into each of the one or more key bits that is then compared to the correct key value. A value to correctly set each key bit can be changed based on an operational history of the integrated circuit. The operational history of the integrated circuit can be stored in a nonvolatile memory. The operational history can be reset whenever a power to the integrated circuit is turned on, or a specified update value is clocked into an update cell. The operational history can correspond to a sequence of previously applied test signals, or a sequence of previously applied data signals, or a sequence of previously applied functional signals, or a sequence of previously applied control signals, or a sequence of scan cell circuits that have been opened or closed, or a value of a real time clock, or a combination thereof.

In another example, the first scan cell circuit or the second scan cell circuit includes a segment insertion bit circuit that requires clocking of a correct update value in an update cell and a correct key value in each of one or more key bits to change the segment insertion bit circuit to: (a) the first specified state, the different state, or both the first specified state and the different state with respect to the first scan cell circuit, or (b) the second specified state, the different state, or both the second specified state and the different state with respect to the second scan cell circuit. The correct key value can include a correct open value in each of one or more key bits to open the segment insertion bit circuit, and a correct close value in each of one or more key bits to close the segment insertion bit circuit. The correct open value does not have to be equal to the correct close value. Moreover, the correct open key values and/or correct close key values can be different for each segment insertion bit circuit. As previously described, an embedded instrument, or a function logic circuit, or a memory, or a register, or a decryption circuit, or an encryption circuit, or a circuit input, or shifted into a serial data path, or a combination thereof can generate the correct key value. An embedded instrument, or a function logic circuit, or a memory, or a register, or a decryption circuit, or an encryption circuit, or a circuit input, or shifted into a serial data path, or a combination thereof can generate a key value clocked into each of the one or more key bits that is then compared to the correct key value. A value to correctly set each key bit can be changed based on an operational history of the integrated circuit.

The integrated circuit can also include a counter connected to the one or more key bits, wherein the counter must contain a specified value to operate the segment insertion bit circuit or access the at least one of the one or more hidden content. The specified value can be less than or greater than a threshold value. In some embodiments, the counter only increments when each of the one or more key bits is correctly set. In other embodiments, a value to correctly set each of the one or more key bits changes or does not change on successive shift passes, or update passes, or shift and update passes. The counter can be a scan shift counter, or an update counter, or a scan shift and update counter, or a capture counter.

When the counter is a scan shift counter, the scan shift counter typically must contain a specified shift value before clocking of the correct update value in an update cell to operate the segment insertion bit circuit or access the at least one of the one or more hidden content. When the segment insertion bit circuit is part of a chain or network of scan cell circuits, the specified shift value can be less than a current length of the chain of scan cell circuits, or greater than a required length of the chain of scan cell circuits, or depend on a current configuration of the network of scan cell circuits. The specified shift value can be changed based on an operational history of the integrated circuit. The operational history of the integrated circuit can be stored in a nonvolatile memory. The operational history can be reset whenever a power to the integrated circuit is turned on, or a specified update value is clocked into the update cell. The operational history can correspond to a sequence of previously applied test signals, or a sequence of previously applied data signals, or a sequence of previously applied functional signals, or a sequence of previously applied control signals, or a sequence of scan cell circuits that have been opened or closed, or a value of a real time clock, or a combination thereof. The operational history can be reset with a pre-selected set of operations. Moreover, the specified shift value can be changed each time an update is applied, or a shift enable signal toggles, or an update-enable signal toggles, or a capture-enable signal toggles, or a combination thereof.

Figure 10:
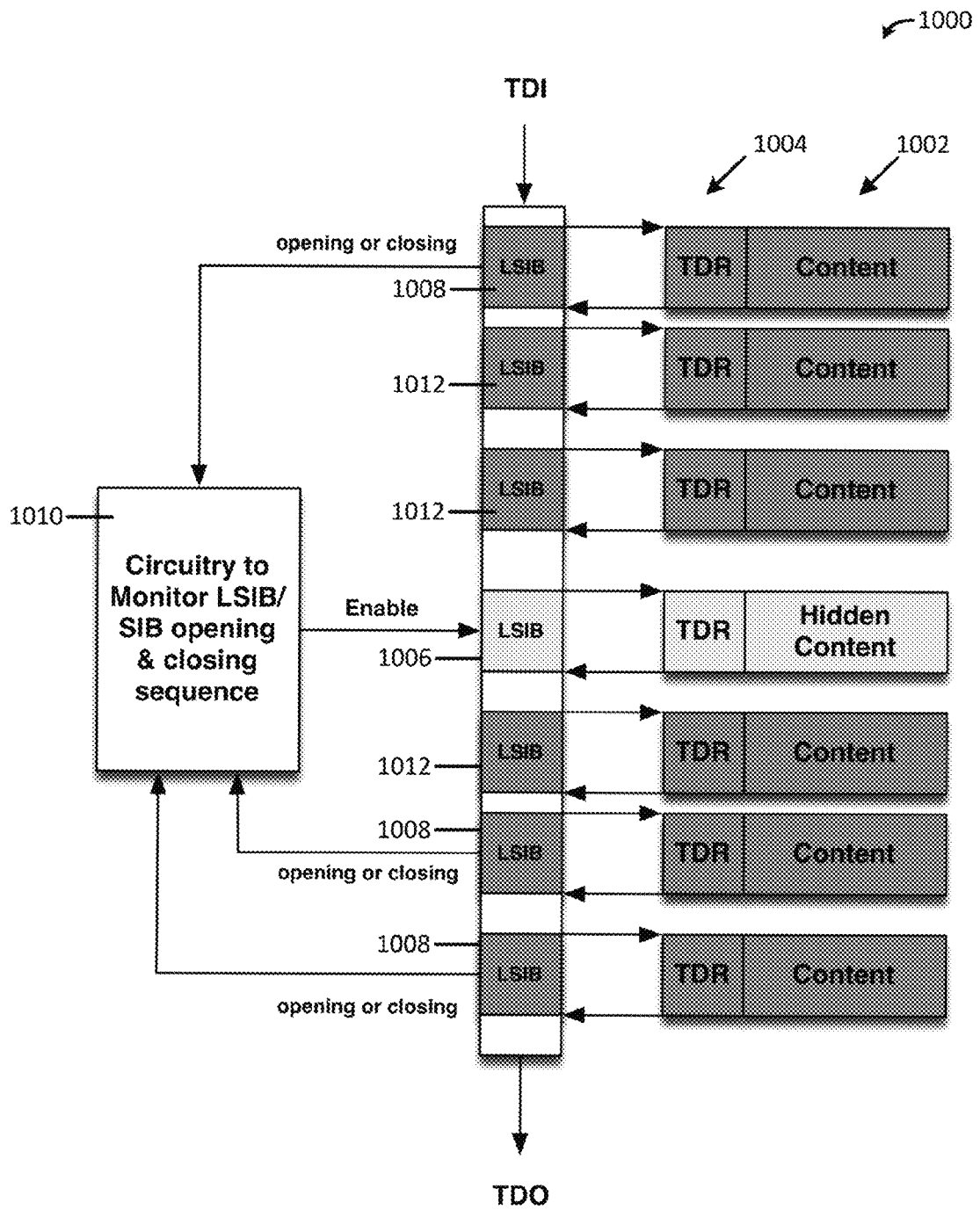
FIG. 10 is a block diagram of a certain set of LSIBs that may need to be open (or closed) for an attacker to be able to open the LSIB in accordance with another embodiment of the present invention.

In another embodiment of the present invention and as shown in FIG. 10, a certain set of LSIBs may need to be open (or closed) for an attacker to be able to open the LSIB. For example, three particular LSIBs out of a set of six LSIBs may need to be opened at once or in a specific order to allow a target LSIB to be opened. This order and set does not necessarily need to be determined by the hierarchical structure of the network.

For example, an integrated circuit 1000 includes one or more hidden content 1002 accessed by TDR 1004, a first scan cell circuit 1006, a second set of scan cell circuits 1008, and circuitry 1010 to monitor LSIB/SIB opening and closing sequences. The integrated circuit 1000 may also include other scan cell circuits 1012 that are not monitored by the circuitry 1010. A first scan cell circuit 1006 is connected to at least one of the one or more hidden content 1002 via TDR 1004, and provides access to the at least one of the one or more hidden content 1002 whenever the first scan cell circuit 1006 is open and not disabled by the circuitry 1010. The set of second scan cell circuits 1008 are connected to the circuitry 1010. The circuitry 1010 disables the first scan cell circuit 1006 unless the set of second scan cell circuits 1008 have a specified status. The specified status can be opening or closing one or more of the set of second scan cell circuits 1008 in a specified sequence. The specified status can also be two or more of the set of second scan cell circuits 1008 being open, closed or a combination thereof at once.

In another embodiment of the present invention, the set of second scan cell circuits 1008 can trigger a trap if the specified status is not correctly performed. In other words, opening LSIBs in the wrong order or opening an incorrect combination of LSIBs could trip a trap. Here the order with which LSIBs should be opened can once again can be made less obvious if it is not obviously tied to the hierarchy.

The present invention can also force LSIBs to be opened from values captured from logic connected to the scan path. For example, generally, the IEEE 1149.1 state machine will go from RunTestIdle, through the capture state, before shifting data into the chain and updating that data. It is generally assumed that an attacker will choose to make complete guesses by completely filling the scan chain with a guess before applying UpdateDR. However, this is not absolutely necessary. In fact, one could take advantage of this fact by incorporating a counter into the design that will count the number of shift cycles that have been applied since capture. At least some of those counter bits can be used as part of the key for one or more LSIBs, allowing an LSIB protecting hidden content to open only when a given number of shift cycles have been applied (where the number of shift cycles that must be applied could be higher or lower than the current chain length.)

If the number of shift cycles applied is lower than the chain length, and if at least some of the key bits for the target LSIB are near the TDO end of the chain, then it is possible that those key bits may be filled not with values shifted in by TDI, but values captured in scan cells earlier in the chain during CaptureDR. Thus, other embedded instruments already on the chain, or embedded instruments may be harnessed and placed on the chain for this purpose as generators of key bits. This would give the attacker significantly less control over the guesses applied as he must correctly operate the corresponding embedded instrument, possibly over many cycles, to allow the correct key bits to be captured.

A further advantage of this approach is that an attacker cannot know how long his guesses must be (i.e. shift cycles) in order to successfully open an LSIB. For example, the number of shift cycles applied can be forced to be much longer than the length of the chain without requiring an equivalent number of scan cells to be present on the chain. If the exact number of shift cycles required is not used, the target LSIB can be forced to not open even if all the other key bits are set. Note that this helps to negate advantages gained when an attacker tries to shift data through the chain at a high frequency.

To further confuse an attacker and obfuscate the way that LSIBs should be opened, the number of bits that must be shifted through the chain could be altered based upon the current configuration of open and closed LSIBs as well as the history of opening those LSIBs. For example, opening a honeytrap could increase the number of bits that must be scanned before the target LSIB is opened. Furthermore, opening the honeytrap again on additional attempts could further increase (or simply change) the number of scan shift cycles required.

In another embodiment of the invention, at least some of the key bits may be stored in a hidden register that is either loaded from data obtained from embedded instruments or other circuitry in the device or extracted from data shifted through the chain. For example, the hidden register could extract a subset of the bits shifted through the chain when those bits have a particular set of characteristics. One example characteristic could include extracting only those bits that have been preceded by a specific pattern of bits shifted into the chain on previous shift cycles. As a simple example, a bit shifted in could be extracted and stored in the hidden register whenever the previous three bits shifted into the chain correspond to the pattern. Note that these three bits do not have to immediately precede the bits extracted, and the bits forming the pattern do not have to be contiguous in the scan shift sequence. Also note that the patterns used to extract bits could change based upon the operational history of the circuit, such as the number of capture or update cycles that have been seen since the circuit was reset or the current configuration of open and closed segment insertion bits or another clock or counter value. Similarly, the value that needs to be placed in the hidden register to successfully meet the key bit requirements could change based upon the operational history of the circuit as well.

Accordingly, a hidden register is connected to the one or more key bits, wherein all or part of the hidden register must be filled with a new data before clocking of the correct update value in an update cell to operate the scan cell circuit(s) or access the at least one of the one or more hidden content. An embedded instrument, or a function logic circuit, or a memory, or a register, or a decryption circuit, or an encryption circuit, or a circuit input, or shifted into a serial data path, or a combination thereof can generate the data for the hidden register. The segment insertion bit circuit can be part of a chain of scan cell circuits, and the hidden register is filled with data shifted through the chain of scan cell circuits. The hidden register can be filled only with some of the data shifted through the chain of scan cell circuits, or data having a predefined characteristic shifted through the chain of scan cell circuits. The data within the hidden register can be used as key bits for other scan cell circuits within a network of scan cell circuits.

In another embodiment of the proposed invention, the integrated circuit could correspond to a 3D stacked IC. A 3D stacked IC consists of multiple dies that are stacked vertically and are generally connected together by through-silicon-vias (TSVs). Such a stack could consist of multiple types of dies and logic, including analog circuitry, processors and controllers, memories, and programmable logic, such as FPGAs. Just as in the case of a 2D IC, a 3D stacked IC could easily be designed to contain a scan network that contains SIBs, LSIBs, locks, traps, honeytraps, etc. for testing, configuration, debug, and embedded instrument access. However, because the interdie communication through TSVs in a 3D stacked IC cannot be directly probed without destroying the stack, additional reduction in attacker feedback is possible in 3D than in 2D. In particular, it can be made difficult or impossible for an attacker to observe the exact sequences shifted into and out of the scan network by restricting those sequences to being generated and possibly analyzed only by circuitry within the stack itself.

For example, one of the dies in the stack may be used as a test controller or test pattern generator to generate the communication bitstream sequences needed to open a sequence of LSIBs to access hidden content, such as embedded instruments. This test controller may contain a complicated authentication protocol to restrict access to the controller's functions to only authorized users. It may reside in programmable logic on an FPGA, in dedicated circuitry, or in software that runs on a processor resident in the stack. The hardware or software used to create/run the test controller may itself reside in an encrypted or obfuscated form in an external memory or in the stack itself. A significant advantage of this approach is that it allows different IP owners to create custom software or firmware for accessing their own IP, such as their own die, while automatically restricting access to other IP owners of other dies in the stack. The presence of keys, LSIBs, honeytraps, etc., in the network is still needed to prevent an attacker with direct access to a bare die before the stack is assembled or internal access to TSVs (such as through Trojan circuitry) from investigating the scan network by running scan shift sequences through the chains and observing results. However, the fact that, in general, the actual communication bitstreams will reside within the stack itself means that even less information regarding the scan network design and contents, may be available to a more conventional attacker, even one with valid licensed software used to access the scan network, than in the 2D case.

Accordingly, the one or more hidden content, the first scan cell circuit and the second scan cell circuit can be disposed within a set of vertically stacked and electrically connected semiconductor dies. A controller disposed on a first semiconductor die accesses the first scan cell circuit and the second scan cell circuit disposed on a second semiconductor die. The controller can be a test controller, a debug controller or a configuration controller. Moreover, the test controller can be a programmable logic circuit, or a dedicated logic circuit, or a processor, or a combination thereof. The test controller can use an authentication protocol to determine what data can be accepted from and given to a user. A bitstream can be stored on a third semiconductor die that operates the first scan cell circuit and the second scan cell circuit. The programming bitstream for the test controller can allow an authorized user to access or disable access to a proprietary data within the set of vertically stacked and electrically connected semiconductor dies. The programming bitstream can be stored in an encrypted or obfuscated form in an external memory. Moreover, the programming bitstream can be stored within the set of vertically stacked and electrically connected semiconductor dies.

The foregoing embodiments and techniques can significantly increase the cost an attacker faces when trying to investigate an IEEE 1687 network containing LSIBs. Although they will not prevent all possible attackers, they can make it less likely that all but the most dedicated attackers will find the hidden instruments by scanning data through the network while using the studied attack modes.

In a real scan network, parts of the network not intended to be secure will be documented in IEEE 1687 PDL and ICL. If an attacker has access to this documentation, he may be able to use it to find the initial chain length as well as the location of non-locking SIBs. Hidden features should not be included.

Other embodiments include: (1) the LSIBs may have two different sets of key bits (one required to open the LSIB and one required to close it); (2) maximizing the number of passes through the network such that trap bits have more chances of being set on an attempt to unlock a target LSIB (such as by requiring multiple scans through the network so that multiple LSIBs of any type (Honeytrap, Naturally Open, Normal, etc.) can increase the ability of a trap bit to prevent access; or (3) keys for different LSIBs can be mutually exclusive.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

The word "exemplary" is used herein to mean "serving as an example, instance, or illustration." Any embodiment described herein as "exemplary" is not necessarily to be construed as preferred or advantageous over other embodiments.

As used in this specification and claim(s), the words "comprising" (and any form of comprising, such as "comprise" and "comprises"), "having" (and any form of having, such as "have" and "has"), "including" (any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or items, such as BB, AAA, AB, BBC, AAABCCCC, CBBAAA, CABABB, and so forth. The skilled artisan will understand that typically there is not limit on the number of item or items in any combination, unless otherwise apparent from the context.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although preferred embodiments of the present invention have been described in detail, it will be understood by those skilled in the art that various modifications can be made therein without departing from the spirit and scope of the invention as set forth in the appended claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

REFERENCES

[1] Jennifer Dworak, Al Crouch, John Potter, Adam Zygmontowicz, and Micah Thornton, "Don't Forget to Lock your SIB: Hiding Instruments using P1687," in *Proceedings of the IEEE International Test Conference*, 2013.

[2] D. Mukhopadhyay, S. Banerjee, D. Roychowdhury, and B. B. Bhattacharya, "CryptoScan: A Secured Scan Chain Architecture," *Test Symp. 2005 Proc. 14th Asian*, pp. 348-353, 18.

[3] A. A. Kamal and A. M. Youssef, "A Scan-Based Side Channel Attack on the NTRUEncrypt Cryptosystem," *Availab. Reliab. Secur. ARES 2012 Seventh Int. Conf. On*, pp. 402-409, 20.

[4] Bo Yang, Kaijie Wu, and R. Karri, "Scan based side channel attack on dedicated hardware implementations of Data Encryption Standard," *Test Conf 2004 Proc. ITC 2004 Int.*, pp. 339-344, 26.

[5] R. F. Buskey and B. B. Frosik, "Protected JTAG," *Parallel Process. Workshop 2006 ICPP 2006 Workshop 2006 Int. Conf. On*, p. 8 pp.-414, 2006.

[6] C. J. Clark, "Anti-tamper JTAG TAP design enables DRM to JTAG registers and P1687 on-chip instruments," *Hardw.-Oriented Secur. Trust HOST 2010 IEEE Int. Symp. On*, pp. 19-24, 2010.

[7] K. Rosenfeld and R. Karri, "Attacks and Defenses for JTAG," *Des. Test Comput. IEEE*, vol. 27, no. 1, pp. 36-47, February 2010.

[8] L. Pierce and S. Tragoudas, "Enhanced Secure Architecture for Joint Action Test Group Systems," *Very Large Scale Integr. VLSI Syst. IEEE Trans. On*, vol. PP, no. 99, pp. 1-1, 2012.

[9] J. Lee, M. Tehranipoor, C. Patel, and J. Plusquellic, "Securing Designs against Scan-Based Side-Channel Attacks," *Dependable Secure Comput. IEEE Trans. On*, vol. 4, no. 4, pp. 325-336, December 2007.

[10] J. Lee, M. Tehranipoor, C. Patel, and J. Plusquellic, "Securing Scan Design Using Lock and Key Technique," in *Defect and Fault Tolerance in VLSI Systems, 2005. DFT 2005. 20th IEEE International Symposium on*, 2005, pp. 51-62.

[11] R. Nara, H. Atobe, Youhua Shi, N. Togawa, M. Yanagisawa, and T. Ohtsuki, "State-dependent changeable scan architecture against scan-based side channel attacks," *Circuits Syst. ISCAS Proc. 2010 IEEE Int. Symp. On*, pp. 1867-1870, May 2010.

[12] G. Sengar, D. Mukhopadhyay, and D. R. Chowdhury, "Secured Flipped Scan-Chain Model for Crypto-Architecture," *Comput.-Aided Des. Integr. Circuits Syst. IEEE Trans. On*, vol. 26, no. 11, pp. 2080-2084, November 2007.

[13] Y. Atobe, Youhua Shi, M. Yanagisawa, and N. Togawa, "Dynamically changeable secure scan architecture against scan-based side channel attack," *SoC Des. Conf. ISOCC* 2012 *Int.,* pp. 155-158, 4.

[14] S. Paul, R. S. Chakraborty, and S. Bhunia, "VIm-Scan: A Low Overhead Scan Design Approach for Protection of Secret Key in Scan-Based Secure Chips," *VLSI Test Symp.* 2007 25th IEEE, pp. 455-460, 6.

[15] J. Da Rolt, G. Di Natale, M.-L. Flottes, and B. Rouzeyre, "Are advanced DfT structures sufficient for preventing scan-attacks?," *VLSI Test Symp. VTS* 2012 *IEEE* 30*th*, pp. 246-251, April 2012.

[16] Suresh Goyal, Michele Portolan, and Bradford Van Treuren, "Patent Application: Method and apparatus for providing scan chain security," U.S. Pat. No. 8,495,758.

[17] I. S. Kim and M. H. Kim, "Agent-based honeynet framework for protecting servers in campus networks," *Inf. Secur. IET*, vol. 6, no. 3, pp. 202-211, September 2012.

What is claimed is:

1. An integrated circuit comprising:
one or more hidden content;
a first segment insertion bit circuit connected to at least one of the one or more hidden content;
a second segment insertion bit circuit connected to the first segment insertion bit circuit;
the first segment insertion bit circuit and the second segment insertion bit circuit form all or part of a serial data path;
the first segment insertion bit circuit provides access to the at least one of the one or more hidden content whenever the first segment insertion bit circuit is in a first specified state and prevents access to the at least one of the one or more hidden content whenever the first segment insertion bit scan cell circuit is in a different state than the first specified state;
the first segment insertion bit circuit does not interrupt the serial data path when the first segment insertion bit circuit in the first specified state or the different state;
whenever the second insertion bit circuit changes to a second specified state, the second segment insertion bit circuit changes an operational characteristic of the first segment insertion bit circuit by one or more of: (a) disabling the first segment insertion bit circuit, (b) causing a delay in changing the first segment insertion bit circuit to the first specified state, the different state, or both the first specified state and the different state, (c) causing the first segment insertion bit circuit or another circuit connected to the first segment insertion bit circuit or another circuit within the serial data path to operate at a slower scan shift frequency, (d) introducing a required change in a shift path voltage of the first segment insertion bit circuit or another circuit connected to the first segment insertion bit circuit or another circuit within the serial data path, or (e) automatically changing the first segment insertion bit circuit to the different state if the first segment insertion bit circuit is in the first specified state or preventing the first segment insertion bit circuit from being in the first specified state whenever one or more conditions are detected;
the second insertion bit circuit does not interrupt the serial data path when the second segment insertion bit is in any state; and
the first segment insertion bit circuit or the second segment insertion bit circuit requires clocking of a correct update value in an update cell and a correct key value in each of one or more key bits to change the segment insertion bit circuit to: (a) the first specified state, the different state, or both the first specified state and the different state with respect to the first segment insertion bit circuit, or (b) the second specified state, the different state, or both the second specified state and the different state with respect to the second segment insertion bit circuit.

2. The integrated circuit as recited in claim 1, wherein:
the first segment insertion bit circuit provides access to the at least one of the one or more hidden content by inserting the at least one of the one or more hidden content into the serial data path; and
the first segment insertion bit circuit prevents access to the at least one of the one or more hidden content by removing the at least one of the one or more hidden content from the serial data path.

3. The integrated circuit as recited in claim 1, wherein:
the one or more hidden content comprises a first hidden content and a second hidden content;
the first segment insertion bit circuit is connected to the first hidden content;
the second segment insertion bit circuit is connected to the second hidden content; and
the second segment insertion bit circuit provides access to the second hidden content whenever the second segment insertion bit circuit is in the first specified state and prevents access to the second hidden content whenever the second segment insertion bit circuit is in the different state.

4. The integrated circuit as recited in claim 3, wherein:
the first hidden content comprises a first data that is used in an operation of the integrated circuit; and
the second hidden content comprises a second data that is not used in the operation of the integrated circuit.

5. The integrated circuit as recited in claim 3, wherein:
the first hidden content has a first interface size;
the second hidden content has a second interface size; and
the first interface size is equal to the second interface size.

6. The integrated circuit as recited in claim 1, wherein the first specified state is open, the second specified state is open, and the different state is closed.

7. The integrated circuit as recited in claim 1, wherein the first specified state is open, the second specified state is closed, and the different state is closed.

8. The integrated circuit as recited in claim 1, wherein changing the second segment insertion bit circuit to the second specified state requires fewer process steps or correct inputs than changing the first segment insertion bit circuit to the first specified state.

9. The integrated circuit as recited in claim 1, wherein the second segment insertion bit circuit disables the first segment insertion bit circuit by preventing the first segment insertion bit circuit from changing to the first specified state, or the different state, or both the first specified state and the different state.

10. The integrated circuit as recited in claim 1, wherein the second segment insertion bit circuit disables the first segment insertion bit circuit by immediately changing the first segment insertion bit circuit to the different state if the first segment insertion bit circuit is in the first specified state and preventing the first segment insertion bit circuit from changing to the first specified state.

11. The integrated circuit as recited in claim 1, wherein the delay is incrementally increased.

12. The integrated circuit as recited in claim 1, wherein the first segment insertion bit circuit can only be changed to the first specified state after the second segment insertion bit circuit causes the delay.

13. The integrated circuit as recited in claim 1, wherein the slower scan shift frequency is incrementally decreased.

14. The integrated circuit as recited in claim 1, wherein the first segment insertion bit circuit can only be changed to the first specified state after the second segment insertion bit circuit causes the slower scan shift frequency.

15. The integrated circuit as recited in claim 1, wherein the first segment insertion bit circuit can only be changed to the first specified state after the second segment insertion bit circuit introduces the required change in the shift path voltage of the first segment insertion bit circuit or another circuit connected to the segment insertion bit circuit or another circuit within the serial data path.

16. The integrated circuit as recited in claim 1, wherein:
the first segment insertion bit circuit comprises a first locking segment insertion bit circuit;
the second segment insertion bit circuit comprises a second locking segment insertion bit circuit; and
the one or more hidden content comprises one or more embedded instruments, or keys, or traps, or serial registers, or data.

17. The integrated circuit as recited in claim 1, wherein the second segment insertion bit circuit comprises a honeytrap locking segment insertion bit circuit.

18. The integrated circuit as recited in claim 1, wherein the correct key value comprises:
a correct open value in each of one or more key bits to open the segment insertion bit circuit; and
a correct close value in each of one or more key bits to close the segment insertion bit circuit.

19. The integrated circuit as recited in claim 18, wherein the correct open value is not equal to the correct close value.

20. The integrated circuit as recited in claim 1, wherein the correct open key values are different for each segment insertion bit circuit.

21. The integrated circuit as recited in claim 1, wherein the correct close key values are different for each segment insertion bit circuit.

22. The integrated circuit as recited in claim 1, wherein the correct key value is generated by an embedded instrument, or a function logic circuit, or a memory, or a register, or a decryption circuit, or an encryption circuit, or a circuit input, or shifted into a serial data path, or a combination thereof.

23. The integrated circuit as recited in claim 1, wherein:
a key value clocked into each of the one or more key bits is generated by an embedded instrument, or a function logic circuit, or a memory, or a register, or a decryption circuit, or an encryption circuit, or a circuit input, or shifted into a serial data path, or a combination thereof; and
the key value clocked into each of the one or more key bits is compared to the correct key value.

24. The integrated circuit as recited in claim 1, further comprising a counter connected to the one or more key bits, and wherein the counter must contain a specified value to operate the segment insertion bit circuit or access the at least one of the one or more hidden content.

25. The integrated circuit as recited in claim 24, wherein the specified value is less than or greater than a threshold value.

26. The integrated circuit as recited in claim 24, wherein the counter only increments when each of the one or more key bits is correctly set.

27. The integrated circuit as recited in claim 24, wherein a value to correctly set each of the one or more key bits changes or does not change on successive shift passes, or update passes, or shift and update passes.

28. The integrated circuit as recited in claim 24, wherein the counter comprises a scan shift counter, or an update counter, or a scan shift and update counter.

29. The integrated circuit as recited in claim 28, wherein the scan shift counter must contain a specified shift value before clocking of the correct update value in an update cell to operate the segment insertion bit circuit or access the at least one of the one or more hidden content.

30. The integrated circuit as recited in claim 29, wherein:
the segment insertion bit circuit is part of a chain of scan cell circuits; and
the specified shift value is less than a current length of the chain of scan cell circuits.

31. The integrated circuit as recited in claim 29, wherein:
the segment insertion bit circuit is part of a chain of scan cell circuits; and
the specified shift value is greater than a required length of the chain of scan cell circuits.

32. The integrated circuit as recited in claim 29, wherein:
the segment insertion bit circuit is part of a network of scan cell circuits; and
the specified shift value depends on a current configuration of the network of scan cell circuits.

33. The integrated circuit as recited in claim 29, wherein the specified shift value is changed based on an operational history of the integrated circuit.

34. The integrated circuit as recited in claim 33, wherein the operational history of the integrated circuit is stored in a nonvolatile memory.

35. The integrated circuit as recited in claim 33, wherein the operational history is reset whenever a power to the integrated circuit is turned on, or is reset in response to one or more synchronous signals, or is reset in response to one or more asynchronous signals, or a combination thereof.

36. The integrated circuit as recited in claim 33, wherein the operational history corresponds to a sequence of previously applied test signals, or a sequence of previously applied data signals, or a sequence of previously applied functional signals, or a sequence of previously applied control signals, or a sequence of scan cell circuits that have been opened or closed, or a value of a real time clock, or a combination thereof.

37. The integrated circuit as recited in claim 33, wherein the operational history is reset with a pre-selected set of operations.

38. The integrated circuit as recited in claim 29, wherein the specified shift value is changed each time an update is applied, or a shift enable signal toggles, or an update-enable signal toggles, or a capture-enable signal toggles, or a combination thereof.

39. The integrated circuit as recited in claim 1, further comprising a hidden register connected to the one or more key bits, and wherein all or part of the hidden register must be filled with a new data before clocking of the correct update value in an update cell to operate the scan cell circuit(s) or access the at least one of the one or more hidden content.

40. The integrated circuit as recited in claim 39, wherein the new data is generated by an embedded instrument, or a function logic circuit, or a memory, or a register, or a decryption circuit, or an encryption circuit, or a circuit input, or shifted into a serial data path, or a combination thereof.

41. The integrated circuit as recited in claim 39, wherein:
the segment insertion bit circuit is part of a chain of scan cell circuits; and
the hidden register is filled with data shifted through the chain of scan cell circuits.

42. The integrated circuit as recited in claim 41, wherein the hidden register is only filled with some of the data shifted through the chain of scan cell circuits.

43. The integrated circuit as recited in claim 41, wherein the hidden register is only filled with data having a predefined characteristic shifted through the chain of scan cell circuits.

44. The integrated circuit as recited in claim 39, wherein the data within the hidden register is used as key bits for other scan cell circuits within a network of scan cell circuits.

45. The integrated circuit as recited in claim 1, further comprising a delay circuit connected to the first segment insertion bit circuit, or second segment insertion bit circuit, or both the first and second segment insertion bit circuits.

46. The integrated circuit as recited in claim 1, further comprising a network of scan cell circuits connected between the first segment insertion bit circuit and the at least one of the one or more hidden content.

47. The integrated circuit as recited in claim 1, further comprising a set of key bits connected to the first segment insertion bit circuit, or the second segment insertion bit circuit, or both the first and second segment insertion bit circuits, and wherein a correct key value in each of one or more key bits is required to operate the segment insertion bit circuit(s) or access the at least one of the one or more hidden content.

48. The integrated circuit as recited in claim 47, wherein the correct key value is generated by an embedded instrument, or a function logic circuit, or a memory, or a register, or a decryption circuit, or an encryption circuit, or a circuit input, or shifted into a serial data path, or a combination thereof.

49. The integrated circuit as recited in claim 47, wherein:
a key value clocked into each of the one or more key bits is generated by an embedded instrument, or a function logic circuit, or a memory, or a register, or a decryption circuit, or an encryption circuit, or a circuit input, or shifted into a serial data path, or a combination thereof; and
the key value clocked into each of the one or more key bits is compared to the correct key value.

50. The integrated circuit as recited in claim 47, wherein a value to correctly set each key bit is changed based on an operational history of the integrated circuit.

51. The integrated circuit as recited in claim 50, wherein the operational history of the integrated circuit is stored in a nonvolatile memory.

52. The integrated circuit as recited in claim 50, wherein the operational history is reset whenever a power to the integrated circuit is turned on, or a specified update value is clocked into an update cell.

53. The integrated circuit as recited in claim 50, wherein the operational history corresponds to a sequence of previously applied test signals, or a sequence of previously applied data signals, or a sequence of previously applied functional signals, or a sequence of previously applied control signals, or a sequence of scan cell circuits that have been opened or closed, or a value of a real time clock, or a combination thereof.

54. The integrated circuit as recited in claim 1, wherein the second segment insertion bit circuit comprises a set of second segment insertion bit circuits connected to the first scan cell circuit, and the set of second segment insertion bit circuits change an operational characteristic of the first segment insertion bit circuit unless the set of second segment insertion bit circuits have a specified status.

55. The integrated circuit as recited in claim 54, wherein the specified status comprises opening or closing one or more of the set of second segment insertion bit circuits in a specified sequence.

56. The integrated circuit as recited in claim 54, wherein the specified status comprises two or more of the set of second segment insertion bit circuits being open, closed, or a combination thereof at once.

57. The integrated circuit as recited in claim 54, wherein the set of second segment insertion bit circuits trigger a trap if the specified status is not correctly performed.

58. The integrated circuit as recited in claim 54, wherein the set of second segment insertion bit circuits includes a honeytrap locking segment insertion bit circuit.

59. The integrated circuit as recited in claim 54, wherein the set of second segment insertion bit circuits includes a naturally open locking segment insertion bit circuit.

60. The integrated circuit as recited in claim 1, wherein the one or more conditions comprise a circuit reset, a specified data from a real time clock, a specified time period since the first segment insertion bit circuit was changed to the first specified state, a specified number of clock cycles since the first segment insertion bit circuit was changed to the first specified state, a specified number of shift cycles since the first segment insertion bit circuit was changed to the first specified state, a specified number of shift-update cycles since the first segment insertion bit circuit was changed to the first specified state, a specified number of capture cycles since the first segment insertion bit circuit was changed to the first specified state, a specified number or set of shift signal toggles, a specified number of capture signal toggles, a specified number of update signal toggles, a specified configuration of voltage domains, a data read or produced by an embedded instrument, a specified data obtained from a geographic location signal, a data obtained from a wireless connection, a data obtained from one or more inputs of the integrated circuit, a specified number of clock cycles while the integrated circuit is in a specified state, a specified toggle sequence of one or more control signals with a clock signal is held at a specified state, or a combination thereof.

61. The integrated circuit as recited in claim 1, wherein:
the first segment insertion bit circuit is part of a first chain of scan cell circuits; and
the second segment insertion bit circuit is part of a second chain of scan cell circuits.

62. The integrated circuit as recited in claim 61, wherein the first chain of scan cell circuits and the second chain of scan cell circuits are at different levels within a hierarchical network of scan cell circuits.

63. The integrated circuit as recited in claim 1, wherein the one or more hidden content comprises an access circuit that enables or disables one or more voltage domains in the integrated circuit, or a voltage accumulator connected to the one or more voltage domains that determines a current status of the one or more voltage domains.

64. The integrated circuit as recited in claim 1, further comprising one or more voltage domains in the integrated circuit, wherein a specified status of the one or more voltage domains is required to change the first segment insertion bit circuit to the first specified state or the different state, or change the second segment insertion bit circuit to the second specified state or the different state, or both.

65. The integrated circuit as recited in claim 64, further comprising a voltage accumulator connected to the one or more voltage domains that determines a current status of the one or more voltage domains.

66. The integrated circuit as recited in claim 1, wherein the one or more hidden content, the first segment insertion bit circuit and the second segment insertion bit circuit are disposed within a set of vertically stacked and electrically connected semiconductor dies.

67. The integrated circuit as recited in claim 66, further comprising a controller disposed on a first semiconductor die that accesses the first segment insertion bit circuit and the second segment insertion bit circuit disposed on a second semiconductor die.

68. The integrated circuit as recited in claim 67, wherein the controller comprises a test controller, a debug controller or a configuration controller.

69. The integrated circuit as recited in claim 67, further comprising a bitstream stored on a third semiconductor die that operates the first segment insertion bit circuit and the second segment insertion bit circuit.

70. The integrated circuit as recited in claim 67, wherein the test controller uses an authentication protocol to determine what data can be accepted from and given to a user.

71. The integrated circuit as recited in claim 67, wherein the test controller comprises a programmable logic circuit, or a dedicated logic circuit, or a processor, or a combination thereof.

72. The integrated circuit as recited in claim 71, further comprising a programming bitstream for the test controller that allows an authorized user to access or disable access to a proprietary data within the set of vertically stacked and electrically connected semiconductor dies.

73. The integrated circuit as recited in claim 72, wherein the programming bitstream is stored in an encrypted or obfuscated form in an external memory.

74. The integrated circuit as recited in claim 72, wherein the programming bitstream is stored within the set of vertically stacked and electrically connected semiconductor dies.

75. The integrated circuit as recited in claim 1, wherein the second segment insertion bit circuit comprises a honeytrap locking segment insertion bit circuit having one or more key bits or a scan cell network connected behind the honeytrap locking segment insertion bit circuit, wherein the one or more key bits must be correctly set to access the at least on of the one or more hidden content connected to the first segment insertion bit circuit.

76. The integrated circuit as recited in claim 1, wherein the second segment insertion bit circuit comprises a honeytrap locking segment insertion bit circuit having a slow clock, wherein the honeytrap locking segment insertion bit circuit must be closed to access the at least on of the one or more hidden content connected to the first segment insertion bit circuit.

77. A method comprising:
providing one or more hidden content, a first segment insertion bit circuit connected to at least one of the one or more hidden content, a second segment insertion bit circuit connected to the first segment insertion bit circuit, the first segment insertion bit circuit and the second segment insertion bit circuit form all or part of a serial data path, and the second insertion bit circuit does not interrupt the serial data path when the second segment insertion bit is in any state;
providing access to the at least one of the one or more hidden content whenever the first segment insertion bit circuit is in a first specified state and preventing access to the at least one of the one or more hidden content whenever the first segment insertion bit scan cell circuit is in a different state than the first specified state, wherein the first segment insertion bit circuit does not interrupt the serial data path when the first segment insertion bit circuit in the first specified state or the different state;
whenever the second insertion bit circuit changes to a second specified state, changing an operational characteristic of the first segment insertion bit circuit using the second segment insertion bit circuit by one or more of: (a) disabling the first segment insertion bit circuit, (b) causing a delay in changing the first segment insertion bit circuit to the first specified state, the different state, or both the first specified state and the different state, (c) causing the first segment insertion bit circuit or another circuit connected to the first segment insertion bit circuit or another circuit within the serial data path to operate at a slower scan shift frequency, (d) introducing a required change in a shift path voltage of the first segment insertion bit circuit or another circuit connected to the first segment insertion bit circuit or another circuit within the serial data path, or (e) automatically changing the first segment insertion bit circuit to the different state if the first segment insertion bit circuit is in the first specified state or preventing the first segment insertion bit circuit from being in the first specified state whenever one or more conditions are detected; and
wherein the first segment insertion bit circuit or the second segment insertion bit circuit requires clocking of a correct update value in an update cell and a correct key value in each of one or more key bits to change the segment insertion bit circuit to: (a) the first specified state, the different state, or both the first specified state and the different state with respect to the first segment insertion bit circuit, or (b) the second specified state, the different state, or both the second specified state and the different state with respect to the second segment insertion bit circuit.

* * * * *